(12) United States Patent
Solomon et al.

(10) Patent No.: US 12,042,894 B2
(45) Date of Patent: Jul. 23, 2024

(54) UNIVERSAL INTERCHANGEABLE PLATE SYSTEM FOR TOOL HEAD ASSEMBLIES

(71) Applicant: WHAM BAM SYSTEMS LLC, Hollywood, FL (US)

(72) Inventors: Peter Solomon, Fort Lauderdale, FL (US); James C. Tongue, Chichester (GB)

(73) Assignee: Wham Bam Systems, LLC, Hollywood, FL (US)

( * ) Notice: Subject to any disclaimer, the term of this patent is extended or adjusted under 35 U.S.C. 154(b) by 1022 days.

(21) Appl. No.: 16/811,607

(22) Filed: Mar. 6, 2020

(65) Prior Publication Data
US 2020/0406410 A1    Dec. 31, 2020

Related U.S. Application Data

(60) Provisional application No. 62/867,310, filed on Jun. 27, 2019.

(51) Int. Cl.
*B23Q 1/26*     (2006.01)
*B23P 23/04*    (2006.01)
*B23Q 3/02*     (2006.01)

(52) U.S. Cl.
CPC ............... *B23Q 1/26* (2013.01); *B23P 23/04* (2013.01); *B23Q 3/02* (2013.01)

(58) Field of Classification Search
CPC ......... B23P 23/04; B23Q 1/0009; B23Q 1/26; B23Q 1/58; B23Q 3/02; B23Q 37/00
See application file for complete search history.

(56) References Cited

U.S. PATENT DOCUMENTS

2011/0049778 A1*  3/2011  Pawa ............... B23Q 1/0009
                                                      269/20
2014/0015389 A1*  1/2014  Vatterott ......... B23Q 1/0045
                                                      312/294
(Continued)

FOREIGN PATENT DOCUMENTS

WO    2012020164 A1    2/2012
WO    2015038072 A1    3/2015

OTHER PUBLICATIONS

Jon Schone, "Custom connect for the creality printer with swappable hot end", https://properprinting.pro/.
(Continued)

*Primary Examiner* — Dana Ross
*Assistant Examiner* — James F Sims, III
(74) *Attorney, Agent, or Firm* — Laurence A. Greenberg; Werner H. Stemer; Ralph E. Locher

(57) ABSTRACT

A universal plate system for mounting tool heads and/or components on manufacturing machines includes a fixed plate assembly on the x-carriage of the manufacturing machine. A mobile plate assembly is configured to removably attach to the fixed plate assembly, to provide mechanical support and electrical connectivity to a tool head assembly mounted to the mobile plate assembly. The mobile plate assembly can be easily detached from the fixed plate assembly and replaced with a different mobile plate assembly having a different tool head assembly mounted thereon. Mating of the mobile plate assembly to the fixed plate assembly provides the mechanical and electrical connection between the manufacturing machine and the newly mounted tool head assembly, thus permitting quick changes of the tool head assembly to be made.

12 Claims, 15 Drawing Sheets

(56) References Cited

U.S. PATENT DOCUMENTS

| | | | |
|---|---|---|---|
| 2014/0094945 A1 | 4/2014 | Hormann et al. | |
| 2015/0174824 A1 | 6/2015 | Gifford et al. | |
| 2016/0184941 A1* | 6/2016 | Kao | B23Q 1/0009 |
| | | | 307/104 |
| 2018/0326660 A1 | 11/2018 | Gifford et al. | |

OTHER PUBLICATIONS

Jon Schone, "Design and print a custom connector for the Creality printer with swappable hot end" YouTube video, Nov. 17, 2019, https://www.youtube.com/watch?v=I-izkShIDXU.

Jon Schone, "Quick tool change with Z-homing", https://properprinting.pro/product/quick-tool-change-with-z-homing/.

Jon Schone, "Swappable E3D v6 hot end", https://properprinting.pro/product/swappable-e3d-v6-hot-end/.

Georg Hofstetter, "[3D-Print] Custom geeetech i3 printhead", published by geggo, Dec. 23, 2016, http://www.g3gg0.de/wordpress/uncategorized/3d-custom-geeetech-i3-printhead-and-some other-stuff/.

Youtube Video, "My custom printhead (geeetech prusa i3 clone)", Dec. 24, 2016 https://youtu.be/DXHGfVp7id0.

Youtube Video, "Printhead swapping", Sep. 24, 2017, https://youtu.be/RMoyh84kEiw.

Viktor Silivanov, "Quick Swap Board for 3D Printer Hotend" May 4, 2019, https://www.hackster.io/viktorsilivanov/quick-swap-board-for-3d-printer-hotend-fb26e4.

Thinginverse, Quick Fit System—Betlog Version, by Betlog, Apr. 16, 2018, https://www.thingiverse.com/thing:2864216.

Ben James, "Hackaday—3D-Printer gets hot-swappable hot-ends" Apr. 9, 2018 https://hackaday.com/2018/04/09/3d-printer-gets-hot-swappable-hot-ends/.

Fabbaloo, "This Tool-Changing 3D Printer Allows Quick Swap for Materials and Colors", Jan. 31, 2019 https://www.solidsmack.com/fabrication/this-tool-changing-3d-printer-allows-quick-swap-for-materials-and-colors/.

Jon Schone, "About Properprinting", https://www.thingiverse.com/ProperPrinting/about.

Richrap, "Quick-Fit X carriage and Extruder—LM8UU", Mar. 20, 2012, https://www.thingiverse.com/thing:19590.

ProperPrinting, Swappable hot end for Crealty CR-10, Apr. 7, 2019, https://www.thingiverse.com/thing:3547740.

\* cited by examiner

UNIVERSAL INTERCHANGEABLE PLATE SYSTEM FOR TOOL HEAD ASSEMBLIES

CROSS-REFERENCE TO RELATED APPLICATIONS

The present application claims priority to Provisional Patent Application No. 62/867,310, entitled Universal Interchangeable Plate System for Tool Head Assemblies and filed on Jun. 27, 2019, that application being incorporated herein, by reference, in its entirety.

BACKGROUND OF THE INVENTION

Field of the Invention

The invention relates generally to manufacturing, and in particular, to a device that facilitates attaching and detaching tool heads on a variety of machines used for additive and subtractive manufacturing.

Description of the Related Art

The field of rapid manufacturing includes the categories of additive manufacturing and subtractive manufacturing. Examples of additive manufacturing may include fused filament fabrication (FFF)/fused deposition modeling (FDM®), stereolithography (SLA), digital light processing (DLP), selective laser sintering (SLS), selective laser melting (SLM), laminated object manufacturing (LOM), and digital beam melting (EBM). Examples of subtractive manufacturing may include computer numerical control (CNC) milling and laser cutting.

Rapid manufacturing has caused a shift from costly proprietary machines (including their components and consumables) to inexpensive, open-sourced machines. However, proprietary machines require the users to purchase replacement parts and consumables solely from the proprietary manufacturer. Proprietary machines also require using technicians of the proprietary manufacturer for servicing and repair. Open-sourced machines allow the user to replace parts and consumables from a variety of different sources and manufacturers. Additionally, open-sourced machines allow the user to repair and modify their own machines.

In the past, ownership of rapid manufacturing machines was limited to large companies who had the budget to afford the proprietary machines, materials and maintenance. Presently, the inexpensive price of consumer level manufacturing machines has created a market for hobbyists and tinkerers. Not only are these machines economical, so are the components and parts. As a result, the ability to upgrade, repair, and modify machines has created new consumer needs.

There are currently many options of low cost single function rapid manufacturing machines available to consumers, such as FFF printers (i.e., including 3D printers). There are also a limited number of proprietary machines which have interchangeable tool systems. However, there is a lack of solutions which would allow an open-sourced machine user to modify their machine in order to accept various tool heads and allow for easy and rapid interchangeability.

SUMMARY OF THE INVENTION

It is accordingly an object of the invention to provide a device that allows for quickly and easily attaching and detaching tool heads on a variety of machines, and addresses the needs set forth above.

With the foregoing and other objects in view there is provided, in accordance with the invention, a universal interchangeable plate system for tool head assemblies that can be mounted to rapid manufacturing machines in the categories of additive and subtractive manufacturing. In one particular embodiment, the plate system includes two interconnecting assemblies. In that embodiment, the two interconnecting plate assemblies contain attachment features for receiving, powering and controlling tool heads, once mounted to a manufacturing machine.

In one embodiment, one plate assembly in the plate system is a fixed plate assembly that mounts to a carriage plate of the manufacturing machine and makes an electrical connection with the manufacturing machine. In this embodiment, all electrical leads relative to the tool head assembly coming from the manufacturing machine are fed into, and connected to, the fixed plate assembly via terminal blocks or other connectors.

Additionally, in a two plate embodiment, a mobile plate assembly is provided that connects to the fixed plate assembly. The mobile plate assembly has attachment features to allow the electrical and/or mechanical attachment of tool head assemblies and/or components to the mobile plate assembly. The electrical connections are made via terminal blocks or other connectors. The mobile plate assembly makes a mechanical connection with the fixed plate assembly to create a secure assembly and to allow for removal. The mobile plate assembly also makes an electrical connection with the fixed plate assembly, creating a closed circuit that allows for receiving, powering and controlling tool head assemblies that are attached to the mobile plate assembly.

In one embodiment, the mobile plate assembly is removeable from the fixed plate assembly to allow for maintenance, modification, and interchanging of tool head assemblies and components on the mobile plate assembly. Since the mobile plate assembly is detachable from the fixed plate assembly, this plate system allows for fast and easy interchangeability of tool head assemblies.

Other features which are considered as characteristic for the invention are set forth in the drawings, description and appended claims.

Although the invention is illustrated and described herein as embodied in a universal interchangeable plate system for tool head assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which like reference numerals represent like items.

DETAILED DESCRIPTION OF THE INVENTION

Figure 1:
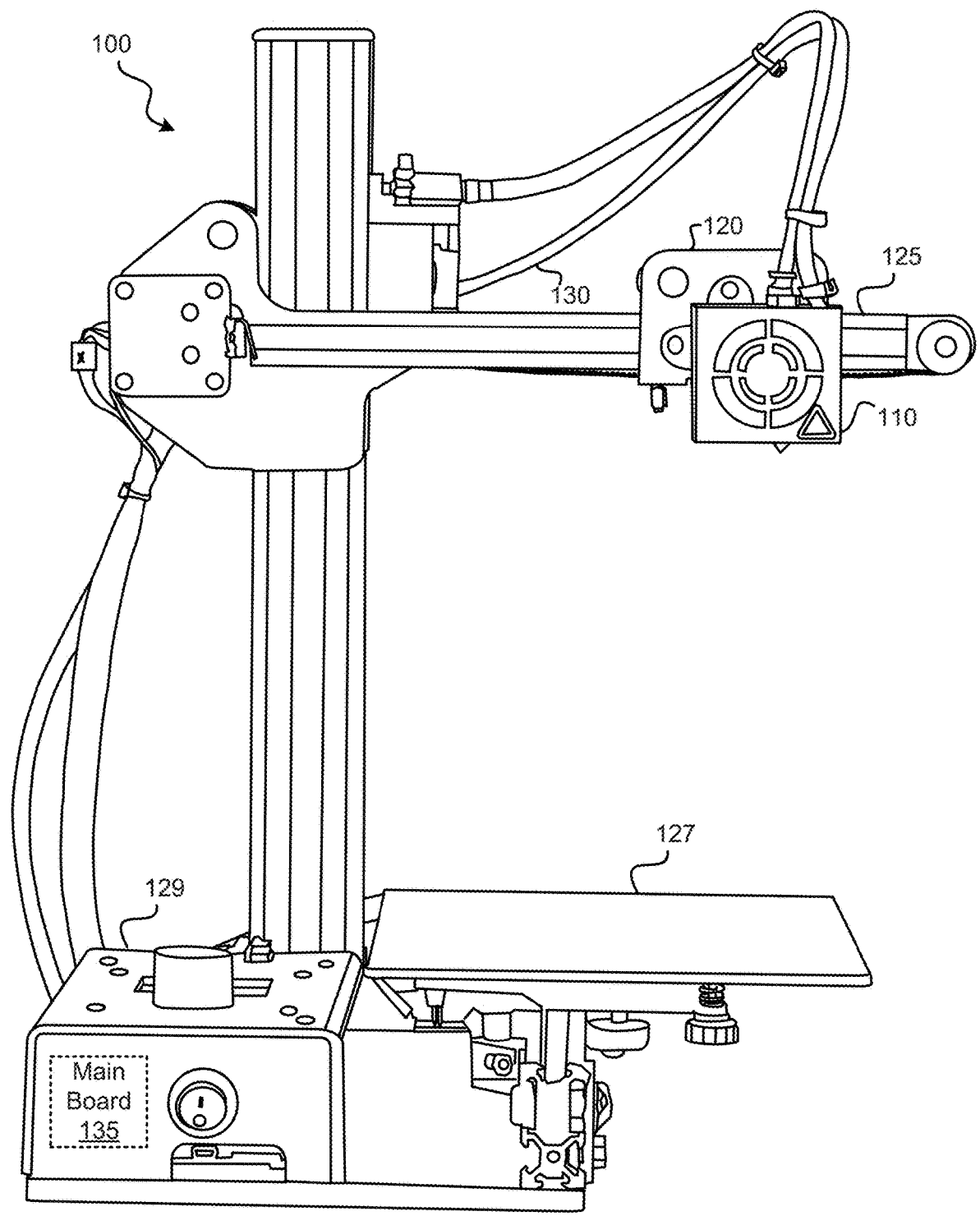
FIG. 1 is a simplified illustration of a manufacturing machine of the prior art, having a tool head assembly mounted directly to a moving carriage plate.

FIG. 1 illustrates a type of manufacturing machine 100 with a moving tool head assembly 110. The machine 100 represents a prior art type of fused deposition manufacturing printer, and is used as an example herein to provide an understanding of the placement of the present invention on a typical manufacturing machine, such as machine 100. However, this is not meant to be limiting, as the present invention is intended for use with any additive or subtractive manufacturing machine that has a carriage plate 120 onto which the tool head assembly 110 is mounted. Additionally, it should be understood that the present invention can be adapted for use on delta-style additive or subtractive manufacturing machines. For example, the plate assembly of the present invention can be adapted for connection to the effector of a delta-style manufacturing machine, rather than to an x-carriage of a Cartesian-style manufacturing machine.

In the particular example of FIG. 1, the manufacturing machine 100, has a tool head assembly 110 mounted directly to a carriage plate 120 of the x-carriage 125 of the machine 100. The carriage plate 120 is a moving component of the manufacturing machine 100, and movements of the carriage plate 120, relative to the print bed or build platform 127 of the manufacturing machine 100, determine the tool path for the manufacturing process. The tool head assembly 110 is powered by way of electrical leads of a wiring harness 130 that connects to either a power supply unit and/or a mainboard 135 in the base 129 of the machine 100.

The present invention relates to a universal interchangeable plate system for tool head assemblies used for additive and subtractive manufacturing. In particular, the certain embodiments of the present invention utilize a machine 100, but provides a plate system to be connected between the tool head assembly 110 and the carriage plate 120 of the machine 100, in order to permit quick and easy changes of the tool assembly 110. In other embodiments, described herein, the interchangeable plate system of the invention replaces the carriage plate 120 of the machine 100, and includes a portion that is mounted to the x-carriage 125 of the machine 100, in place of the carriage plate 120.

Figure 2A:
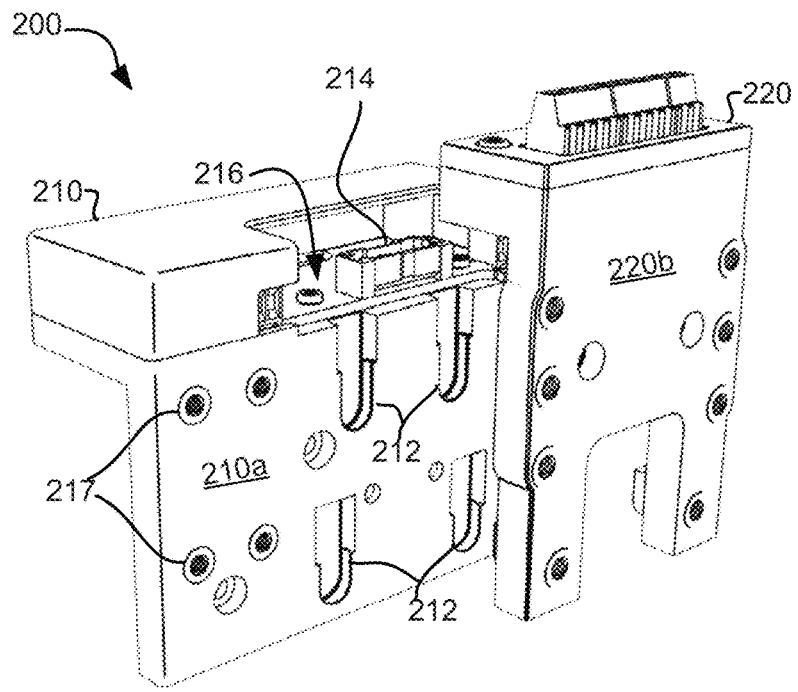
FIG. 2A is a front perspective view of a universal interchangeable plate system in accordance with one particular embodiment of the invention, wherein a fixed plate assembly and mobile plate assembly are detached from one another, in a detached state.
Figure 2B:
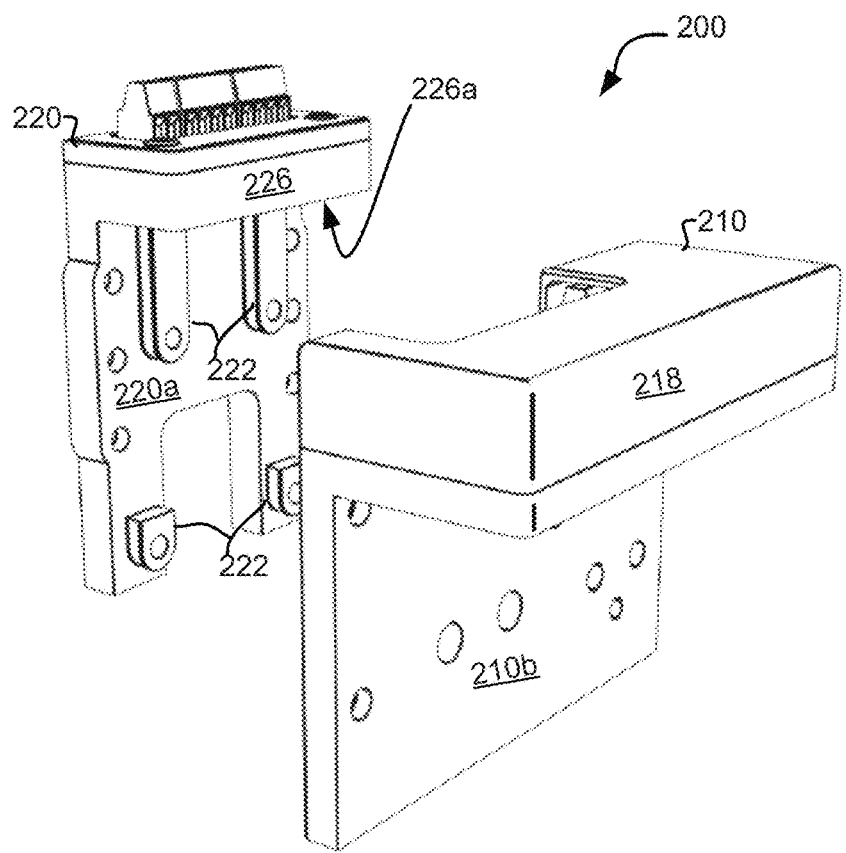
FIG. 2B is a rear perspective view of the universal interchangeable plate system of FIG. 2A in the detached state.

Referring now to FIGS. 2A-2B, there will be described one particular embodiment of a universal interchangeable plate system 200 for tool head assemblies used for additive and subtractive manufacturing, which can be used between the carriage plate 120 of FIG. 1 and the tool head 110 of FIG. 1, in order to provide a quick change of the tool assembly 110. The universal interchangeable plate system 200 of the present embodiment includes two main, separable components: 1) a fixed plate assembly 210; and 2) a mobile plate assembly 220.

FIGS. 2A and 2B illustrate a front view and a rear view, respectively, of the fixed plate assembly 210 and the mobile plate assembly 220 in a detached state, but showing how the fixed plate assembly 210 can be assembled mechanically with the mobile plate assembly 220, by way of matched mechanical mating features, specifically mating features 212 on the fixed plate assembly 210 and complementary mating features 222 on the mobile plate assembly 220. Mating features 222 of the mobile plate assembly 220 are matched to interact and mate with mating features 212 of the fixed plate assembly 210 to enable physical mounting and dismounting of the two plate assemblies of the present invention. Mating features 212 and complementary mating features 222 specifically illustrate a matched dovetail fastening system; however, the mechanical interaction may be accomplished through a variety of mechanical fastening systems, for example without limitation, dovetail joints, grooves, cam lock features, tracks, and other mechanical mounting features to physically mount and dismount the mobile plate assembly 220 from the fixed plate assembly 210.

More particularly, in the embodiment illustrated in FIGS. 2A and 2B, the fixed plate assembly 210 and mobile plate assembly 220 are illustrated as being detached, but are shown in an alignment that would permit connection with one another. In the embodiment illustrated in FIGS. 2A and 2B, the fixed plate assembly 210 and mobile plate assembly 220 are configured to slidingly engage one another. For example, in the present embodiment, key members 222 on the rear face 220a of the mobile plate assembly 220 are configured to engage slots 212 on the front face 210a of the fixed plate assembly 210 (or vice versa, if desired), to mate the two pieces to one another in a tight, frictional fit that holds the two parts together. As discussed above, however, the invention is not meant to be limited to only this configuration, as other mating features or locking mechanisms can be used without departing from the scope and spirit of the present invention.

Figure 5A:
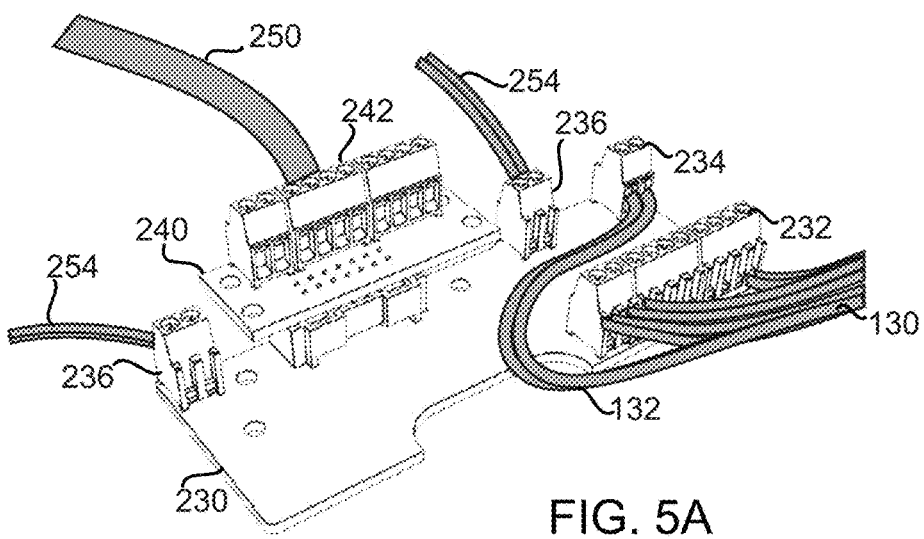
FIG. 5A is a perspective view from the top rear of a mated set of printed circuit boards in accordance with one embodiment of the present invention, having attached wires.
Figure 5B:
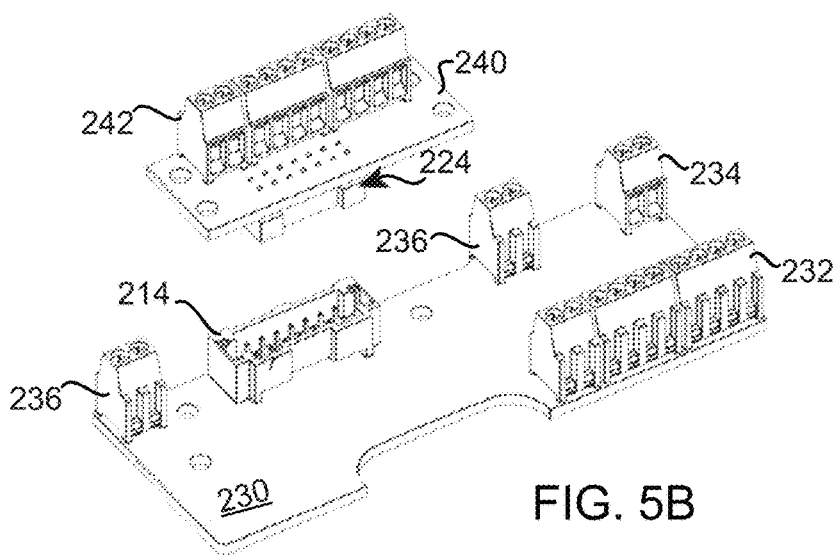
FIG. 5B is a perspective, partially exploded view, taken from the top rear of a set of printed circuit boards in accordance with one embodiment of the present invention, without attached wires.
Figure 5C:
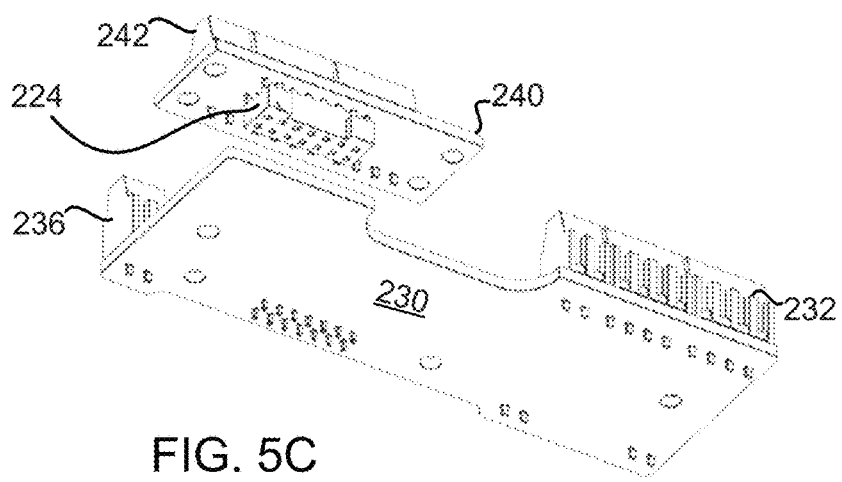
FIG. 5C is a perspective view from the bottom rear of the set of printed circuit boards of FIG. 5B, without attached wires.
Figure 6A:
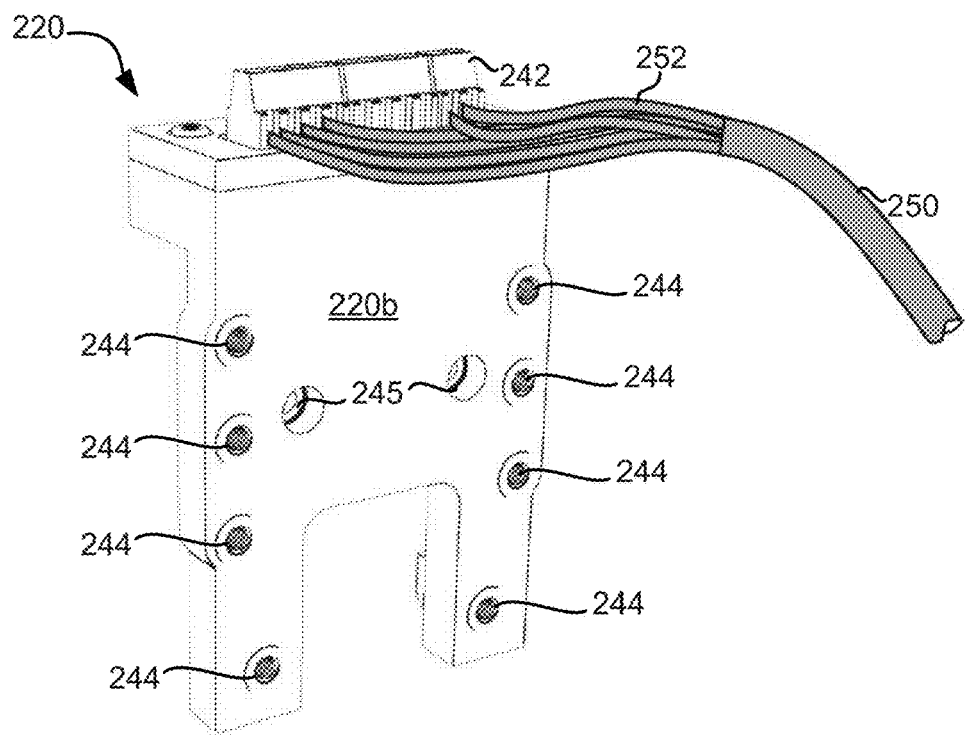
FIG. 6A is an illustration of the assembled mobile plate assembly in accordance with one particular embodiment of the invention.
Figure 6B:
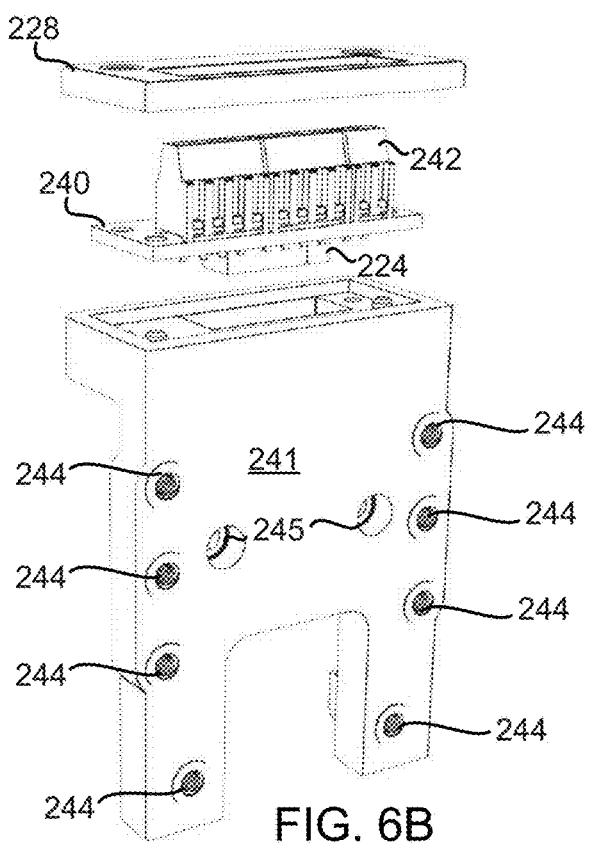
FIG. 6B an exploded view of the mobile plate assembly of FIG. 6A, showing certain mobile plate assembly components in accordance with one embodiment of the invention.

In addition to the electrical connection, in the present embodiment, a further mechanical lock is provided by the mating of an electrical connector (224 of FIGS. 5B and 5C) on the underside of a printed circuit board (230 of FIGS. 5A-5C) of a flange portion 226 of the mobile plate assembly 220 with a mating electrical connector 214 on a shelf portion 216 of the fixed plate assembly 210. The seating of the underside face 226a of the flange portion 226 on the shelf portion 216 of the fixed plate assembly 210 and the tight fit with the surrounding wall of a cover 218, provide further stability to the assembly 200. Thus, in addition to mating with one another using the mechanical connectors, the top portion of the mobile plate assembly 220 (including the connector 224) overhangs, and is supported by, a part of the top portion of the fixed plate assembly 210 above the electrical connector 214, when they are connected.

Figure 3A:
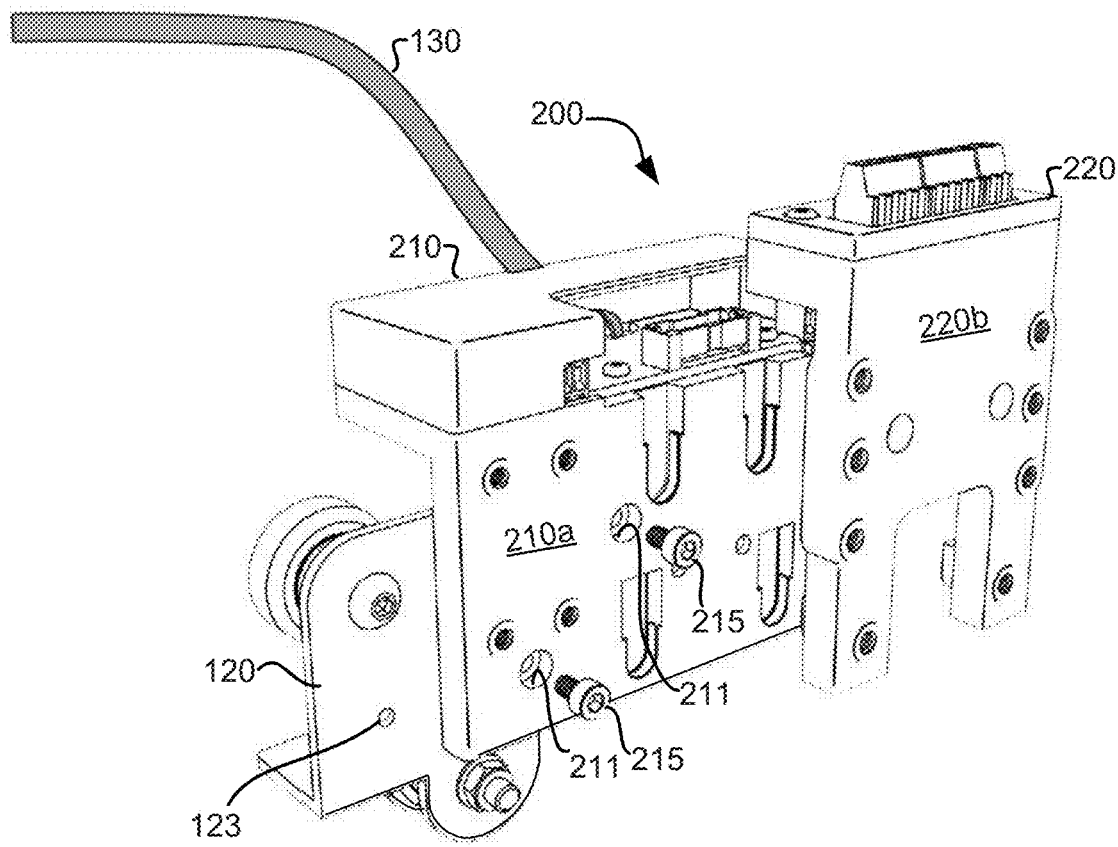
FIG. 3A is a perspective view of the universal interchangeable plate system of one embodiment of the invention, with the fixed plate assembly detached from the mobile plate assembly, and with a carriage plate positioned to be connected with the fixed plate assembly, and the fixed plate assembly positioned to interconnect with the mobile plate assembly.
Figure 3B:
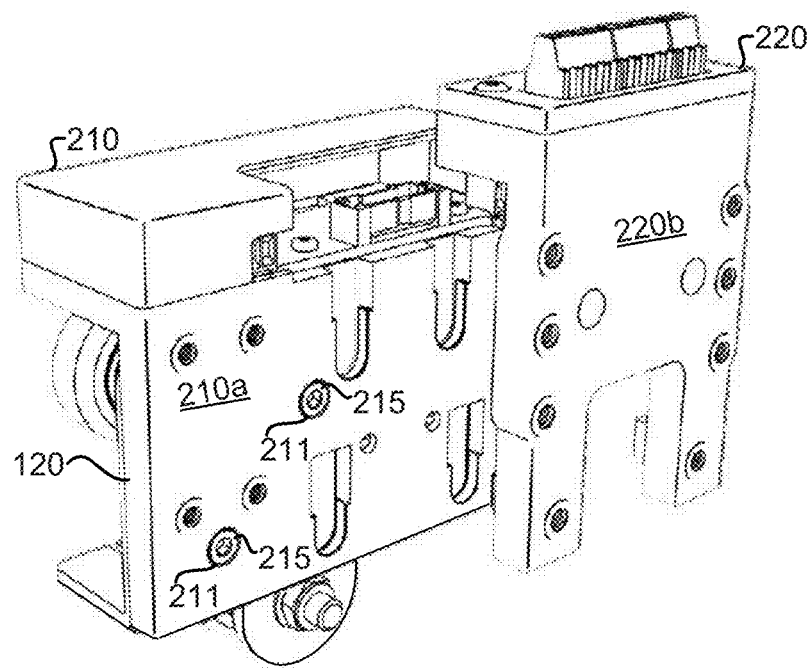
FIG. 3B is a perspective view of the universal interchangeable plate system of one embodiment of the invention, with the fixed plate assembly detached from the mobile plate assembly, and with a carriage plate connected with the fixed plate assembly, and the fixed plate assembly positioned to interconnect with the mobile plate assembly.
Figure 3C:
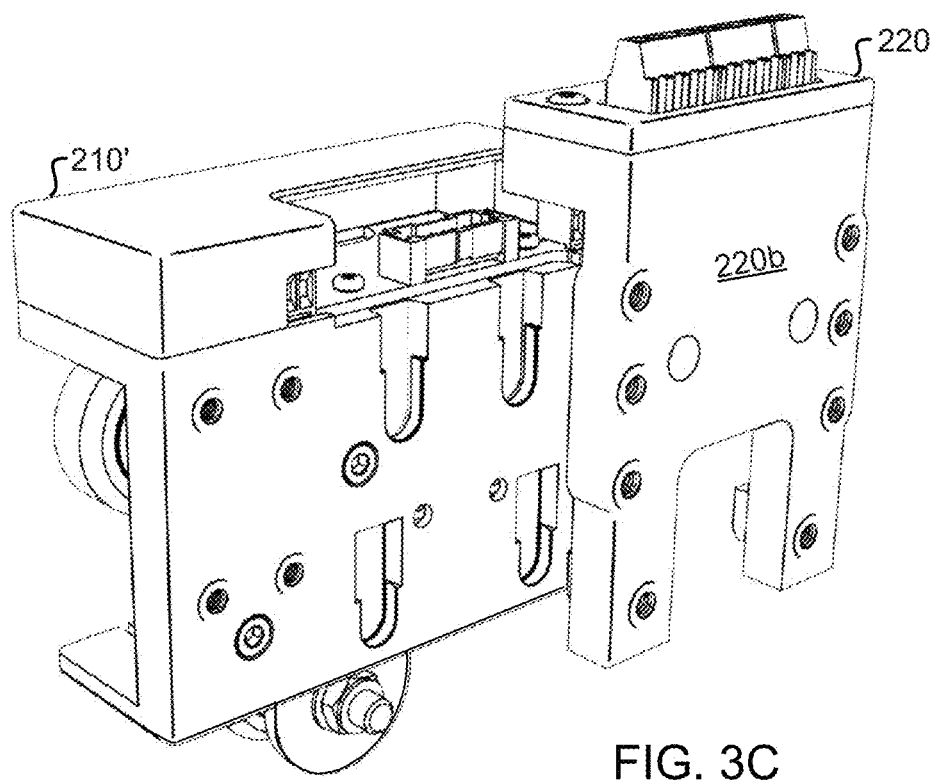
FIG. 3C is a perspective view of a universal interchangeable plate system in accordance with another particular embodiment of the invention, in which a carriage plate and fixed plate assembly are combined into a single unit, and with the mobile plate assembly illustrated in the detached state.

FIGS. 3A and 3B, show a universal interchangeable mounting plate in accordance with one embodiment of the invention in two states of mounting. In particular FIG. 3A shows the carriage plate 120 of a manufacturing machine (100 of FIG. 1) separate from the fixed plate assembly 210, and the mobile plate assembly 220 separate from the fixed plate assembly 210. FIG. 3B shows the fixed plate assembly 210 mounted to the carriage plate 120, while the mobile plate assembly 220 remains separate from the fixed plate assembly 20. Note that, in accordance with another embodiment of the invention, if desired, the fixed plate assembly and carriage plate may be combined together into a single element turning the two plates (i.e., fixed plate assembly 210 and carriage plate 120) into a single assembly 210', as illustrated in FIG. 3C. See also, for example, FIG. 17. This allows for permanent mounting of the fixed plate assembly onto the machine thereby reducing the number of parts used.

Figure 3D:
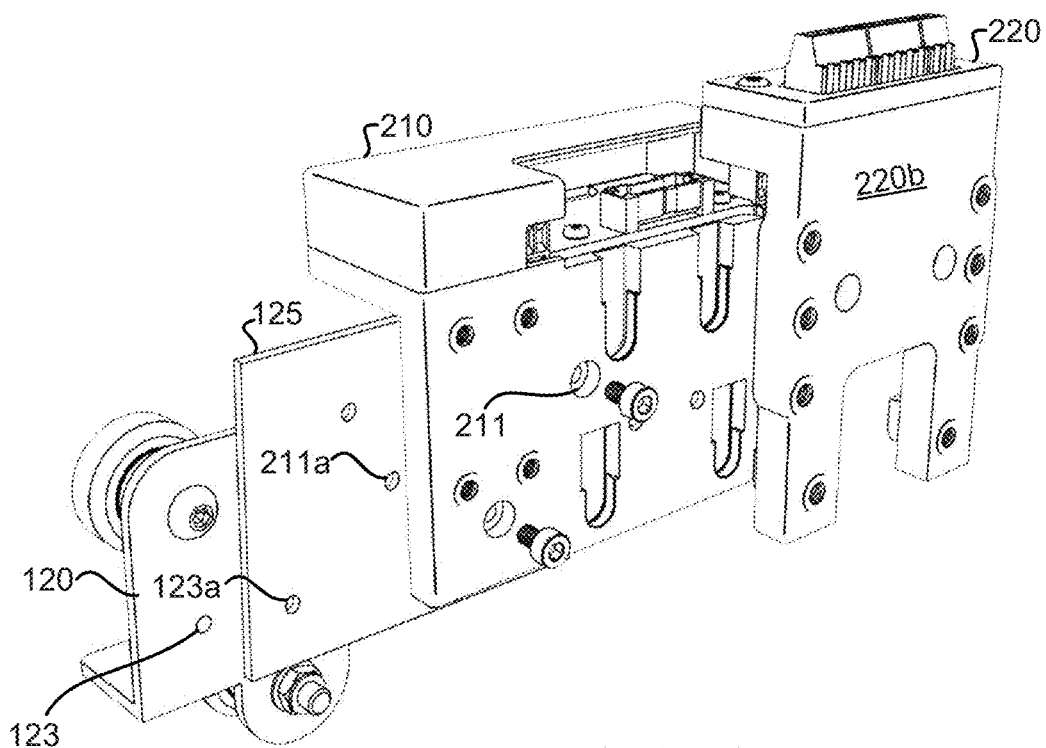
FIG. 3D is a perspective view of a universal interchangeable plate system in accordance with a further particular embodiment of the invention, wherein an adapter plate is used between the fixed plate assembly and a carriage plate in order to mount the fixed plate assembly to the carriage plate of a manufacturing machine.
Figure 4A:
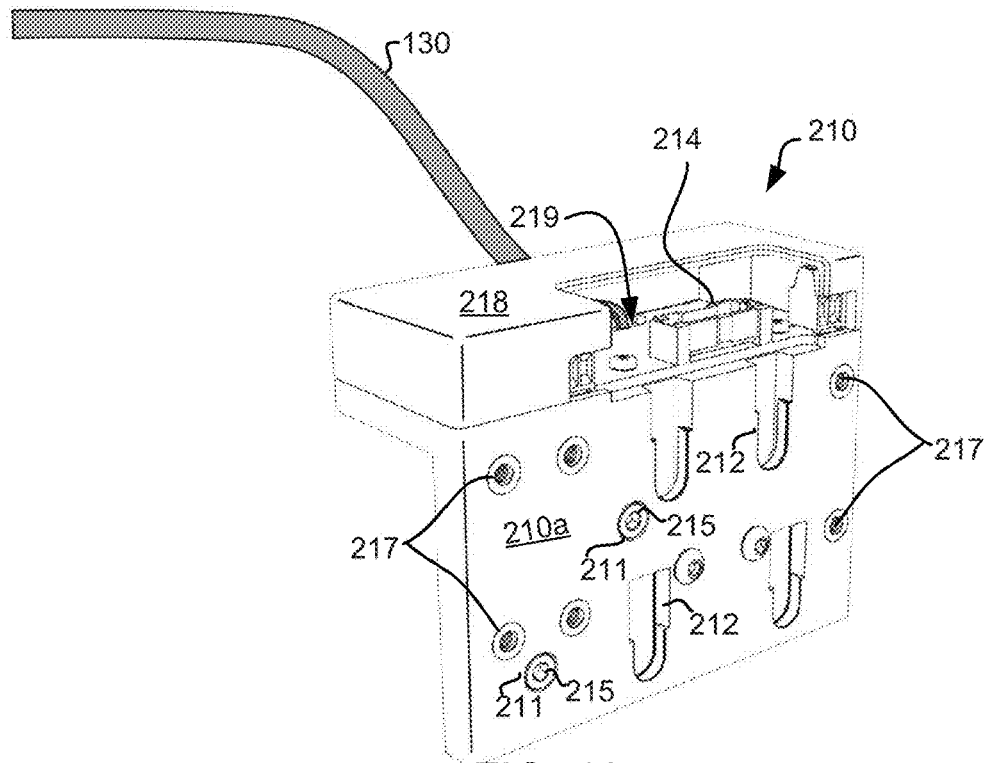
FIG. 4A is an illustration of the assembled fixed plate assembly.
Figure 4B:
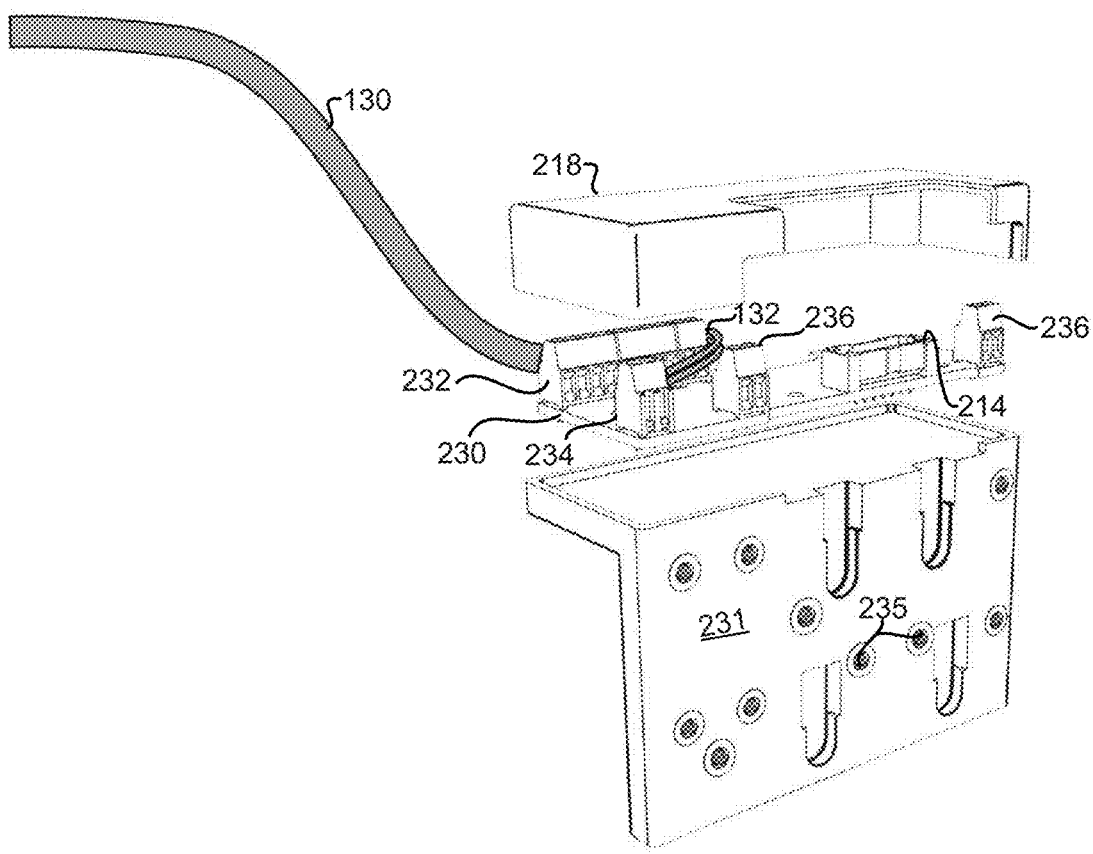
FIG. 4B is an exploded view of the fixed plate assembly showing certain of the fixed plate assembly components.

Further, if desired, as illustrated in FIG. 3D, an adapter plate 125 may be mounted between the carriage plate 120 and the fixed plate assembly 210. The adapter plate 125 may have matched mounting features 123a specific to the mounting features 123 on the applicable carriage plate 120 and have standard mounting features 211a which match to the mounting features 211 of the fixed plate assembly 210. This allows for greater flexibility in adapting to many carriage plate configurations as multiple adapter plates may be available in order to accommodate the widest variety of manufacturing machines.

There are unique advantages to the present invention and how it may interact with a manufacturing machine. Referring now to FIGS. 1-3B, in the present embodiment, the front face 220b of the mobile plate assembly 220 is configured to have a tool assembly (such as tool assembly 110) mounted thereto. Similarly, the rear face 210b of the fixed plate 219 (opposite the front face 210a) is configured to be connected to the carriage plate 120 of the machine 100. Holes or other mechanical mounting features 211 in the fixed plate assembly 210 are configured to align with and mate with pre-existing mechanical mounting features 123 on the carriage plate 120.

Thus, in connection with the present embodiment, FIG. 3A illustrates the carriage plate 120 of a manufacturing machine (100 of FIG. 1) aligned relative to both the fixed plate assembly 210 and the mobile plate assembly 220 of the present embodiment. Specifically, FIG. 3A illustrates how the fixed plate assembly 210 of the present invention is mounted to the carriage plate 120 of a manufacturing machine and how the mobile plate assembly 220 of the present embodiment is aligned to then engage with the fixed plate assembly 210, while it is mounted to the carriage plate 120.

FIG. 3B illustrates the carriage plate 120 of a manufacturing machine (100 of FIG. 1) connected to the fixed plate assembly 210 of the present embodiment in a mounted state, via one possible mating method to secure the fixed plate 210 to the carriage plate 120. For example, in the particular embodiment shown, the fixed plate assembly 210 is removably connected to the carriage plate 120 via screws or bolts 215, passed through countersunk holes 211 of the fixed plate assembly 210 and into mechanical mounting features 123 of the carriage plate 120. However, it should be understood that the mechanical mating of the fixed plate assembly 210 to the carriage plate 120 may be accomplished through a variety of mechanical fastening systems, for example, without limitation, screws, rivets, mechanical locking features, and built-in interlocking features, without departing from the scope or spirit of the present invention. In both of FIGS. 3A and 3B, the plate assemblies 210, 220 of the present embodiment are illustrated in a "detached state", specifically the fixed plate assembly 210 is detached from, and positioned to receive, a mobile plate assembly 220.

Additionally, the mobile plate assembly 220 may have any assortment of tool head components (such as tool head assembly 110 of FIG. 1) and assemblies attached to it mechanically and electrically, for example, without limitation, a fused deposition modeling print head, a laser cutter/engraver, a CNC milling head, and a plunger fed extrusion system. The mobile plate assembly 220 engages and disengages mechanically and electrically with the fixed plate assembly 210. This system allows for rapid removal of a tool head assembly (110 of FIG. 1) for a variety of purposes such as substitution with another tool head type, maintenance, or machine modifications. In one embodiment of the present invention, multiple mobile plate assemblies containing different tool head assemblies may used for rapid interchanging of tool heads and components for use on a manufacturing machine. This allows the quick exchange of one tool head configuration for another which modifies the function of a manufacturing machine with minimal effort.

In order to provide an electrical connection to a tool assembly 110, the fixed plate assembly 210 and mobile plate assembly 220 of the present embodiment are electrically connected to the wiring harness 130 of the machine 100. More particularly, referring now to FIGS. 1-5C, electrical leads of a wiring harness 130 are connected to one or more an electrical connectors 230 of the fixed plate assembly 210, rather than directly to a tool assembly (110 of FIG. 1). The fixed plate assembly 210 may include an opening 219, wherein the wire harness 130 of the manufacturing machine 100 enters into the fixed plate assembly 210. The wire harness 130 contains the electrical leads necessary to power all of the components of a tool head assembly 110. In one particular embodiment of the invention, the fixed plate assembly 210 includes fastening features 217 that can be used to connect a variety of tool head components 110 to the fixed plate assembly 210.

Referring now in particular to FIGS. 4B-5C, the fixed plate assembly 210 includes three main components: (1) a cover 218, (2) a printed circuit board 230, and (3) a main body 231. The cover 218 may cover the printed circuit board 230 and acts to protect and shield the printed circuit board 230 and underlying electrical components.

Figure 9:
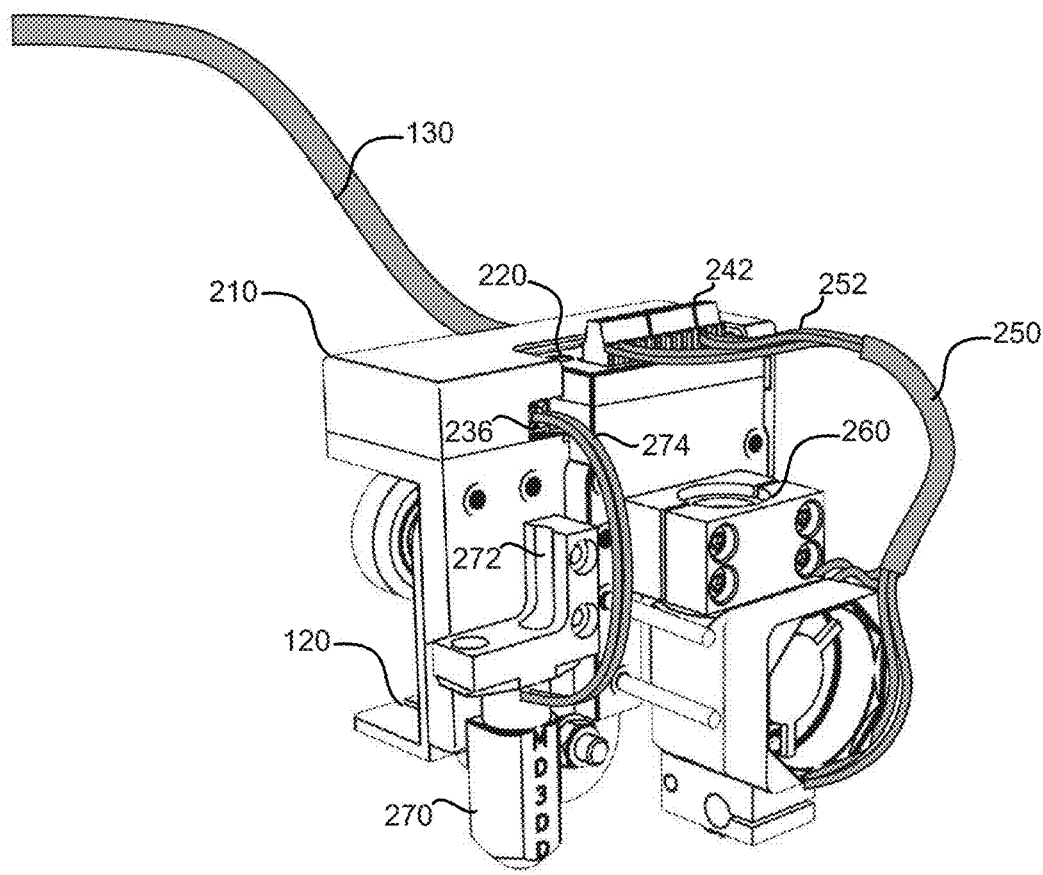
FIG. 9 is a perspective view of a fixed plate assembly connected to a mobile plate assembly and mounted to the carriage plate of a manufacturing machine with an exemplary tool head assembly mounted to the mobile plate assembly and illustrating an example of a further external component mounted to the fixed plate assembly.
Figure 10:
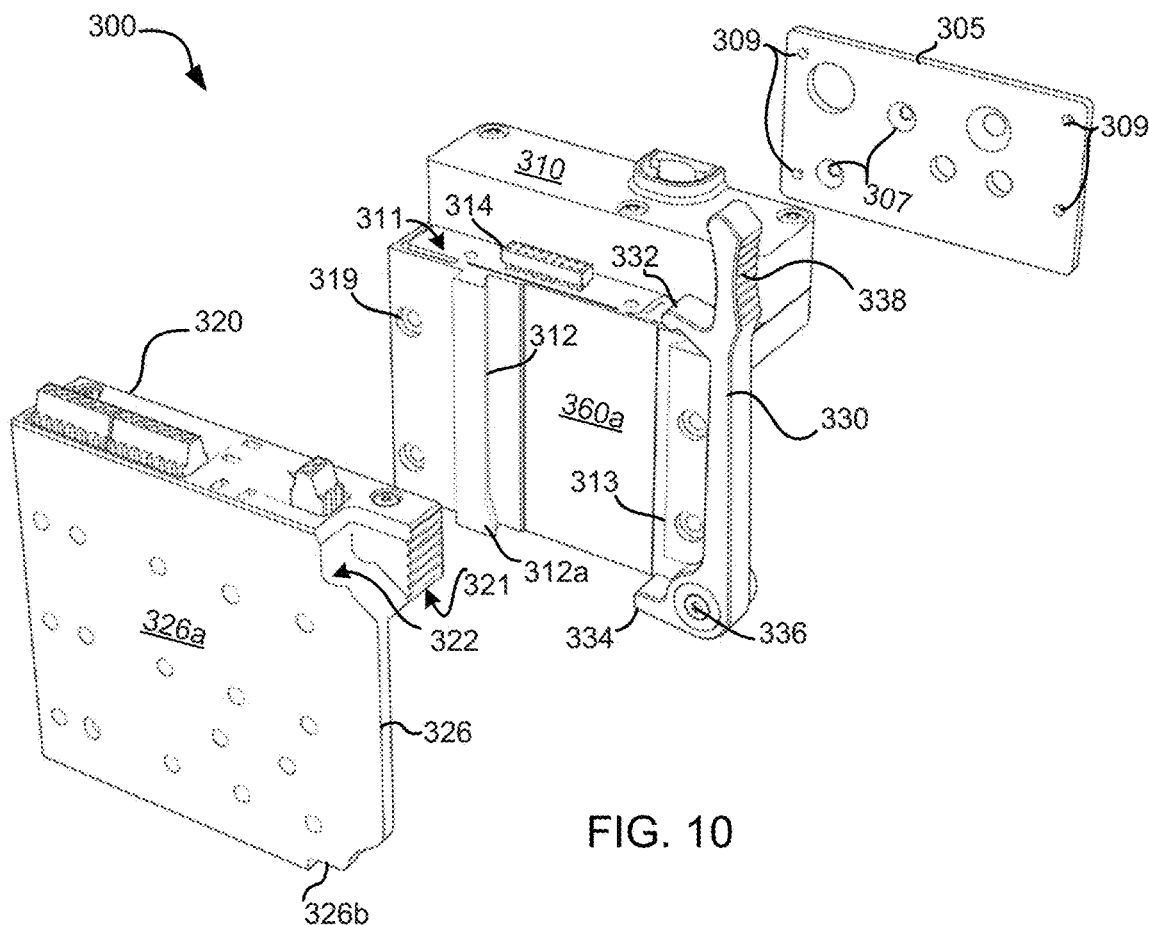
FIG. 10 is a front perspective view of a universal interchangeable plate system in accordance with another particular embodiment of the invention, wherein a fixed plate assembly and mobile plate assembly are detached from one another, in a detached state.

The printed circuit board 232 may contain terminal blocks and/or other wire connections 232 which may accept leads from the wire harness 130. The printed circuit board 22 may also contain terminal blocks and/or other wire connections 234 to accept leads 132 from the wire harness 130, as exemplified by individual leads 132 emanating from wire harness 130 into terminal blocks and/or other wire connections 234 to power terminal blocks and/or other wire connections 236. The printed circuit board 230 may also contain terminal blocks and/or other wire connections 236 to power any components which may be mounted to the main body 231 of the fixed plate assembly 210. The printed circuit board 230 may also contain a rapid connector 214 which may mate with a matched connector 224 on the printed circuit board 240 of the mobile plate assembly 40 (as shown in FIG. 9). The mating of rapid connector 29 to the matched connector 48 closes the circuit to bring power from wire harness 83 to the mobile plate assembly 220 (See, for example, FIGS. 5A-5C) in order to power components and/or tool head assemblies to be mounted on the mobile plate assembly 220. The printed circuit board 230 may be affixed to and/or incorporated into the main body 231 of the fixed plate assembly 210, if desired.

In an alternative embodiment, the wire harness 130 may be connected directly with rapid connector 214 and therefore exclude the necessity of a printed circuit board 230 and/or connectors 232, 234 and 236.

Referring now to FIGS. 5A-6B, the mobile plate assembly 220 includes three main components: (1) a cover 228, (2) a printed circuit board 240, and (3) a main body 241. The main body 241 of the mobile plate assembly 220 may include mounting features 244 to mechanically mount electrical and/or mechanical components to the mobile plate assembly 220. Such mounting features may include holes, threaded inserts, and/or other mechanical fastening features. In this non-limiting example of the mounting features 244, threaded inserts are shown.

The cover 228 may cover the printed circuit board 240 of the mobile plate assembly 220 and serve to protect and shield the printed circuit board 240 and underlying electrical components.

The circuit board 240 of the mobile plate assembly 220 of the present embodiment includes a terminal block and/or other wire connection 242 to power any electrical components that may be mounted to the mobile plate assembly 220. Power is conducted from terminal blocks and/or other wire connections 242 to the above mentioned electrical components via individual wires 252 and/or wire harness 250. The printed circuit board 240 may additionally or alternately include an electrical rapid connector 224 configured to mate with the matched rapid connector 214 on the printed circuit board 230 of the fixed plate assembly 210, when the fixed plate assembly 210 is mated to the mobile plate assembly 220 (see, for example, FIGS. 8B and 9). The printed circuit board 240 may be affixed to, and/or be incorporated into, the body 241 of the mobile plate assembly 220.

In an alternative embodiment, a wire harness 250 may be connected directly with rapid connector 224, and therefore exclude the necessity of a printed circuit board 240.

Referring back to FIGS. 4A-6B, the printed circuit board 240 of the mobile plate assembly 220 may include an electrical rapid connector 224, which may mate with the matched rapid connector 214 on the printed circuit board 230 of the fixed plate assembly 210. See, for example, FIG. 5A. The mating of rapid connector 214 to the matched rapid connector 224 completes the circuit to bring power from the wire harness 130 of the manufacturing machine (100 of FIG. 1) to the wires and/or wire harness 250, in order to power components and/or tool head assemblies to be mounted on the mobile plate assembly 220. Additional leads 132 emanating from the wire harness 130 are provided, which terminate in the terminal blocks and/or other wire connections 232, 234. This brings power to the terminal blocks and/or other wire connections 236 of the printed circuit board 230, which may then power components mounted to the fixed plate assembly 40 through electrical leads 254.

Figure 7:
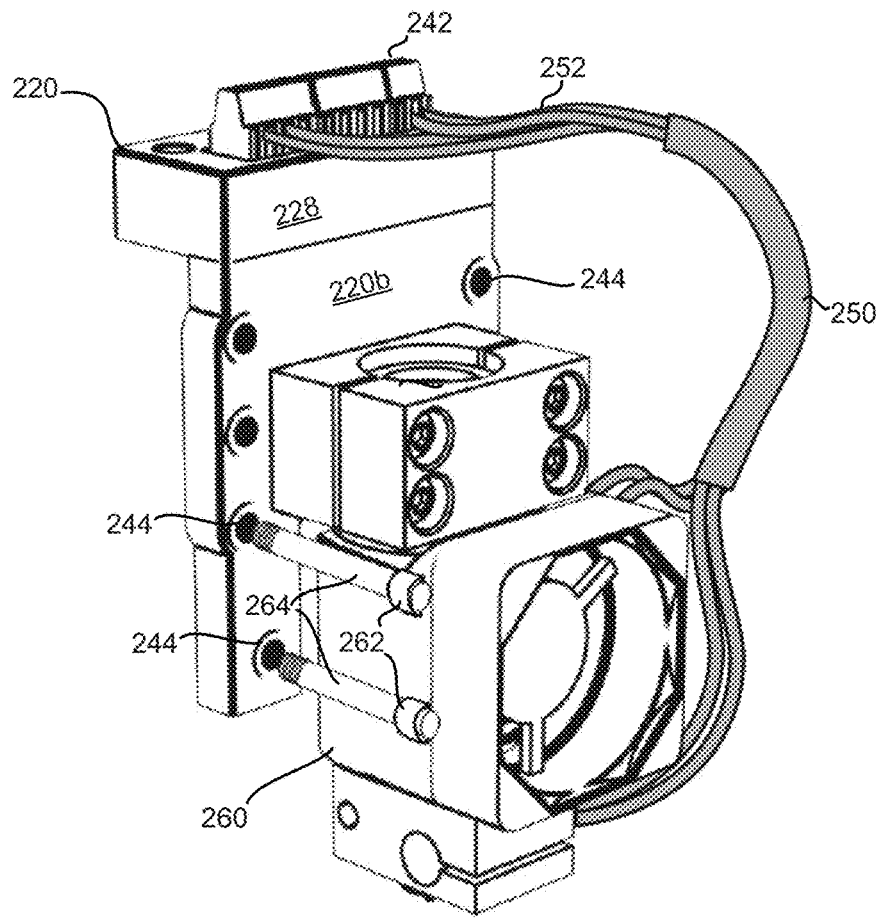
FIG. 7 is a perspective view of a mobile plate assembly with one possible tool head assembly mounted to it, in accordance with one particular embodiment of the invention.

FIG. 7 shows a mobile plate assembly 220 with one example of a potential tool head assembly 260 mounted to it. The use of this particular, exemplary tool head assembly 260, herein, is for discussion purposes, only. It should be understood that any type of tool head assembly may be used within the scope and spirit of the present invention. For example, although the tool head assembly 260 is illustrated as a hot end assembly for fused deposition modeling printing, a wide variety of tool head types may be mounted to the mobile plate assembly 220, for example including, without limitation, a fused deposition modeling print head, a laser cutter/engraver, a CNC milling head, and a plunger fed extrusion system.

The tool head assembly 260 mechanically mounts to the mobile plate assembly 220 via mounting features 262 on the tool head assembly 260 which align with mounting features 244 on the mobile plate assembly 220. As shown in FIG. 7, the tool head assembly 260 is removably mounted to the mobile plate assembly 220 by way of fasteners, such as screws 264, be passed through holes on the tool head assembly 260, and into threaded inserts of the mounting features 244 on the mobile plate assembly 220. Any electrical wires 252 coming from the components of the tool head assembly 260 would terminate in terminal blocks and/or other wire connections 242 on the mobile plate assembly 220.

Figure 8A:
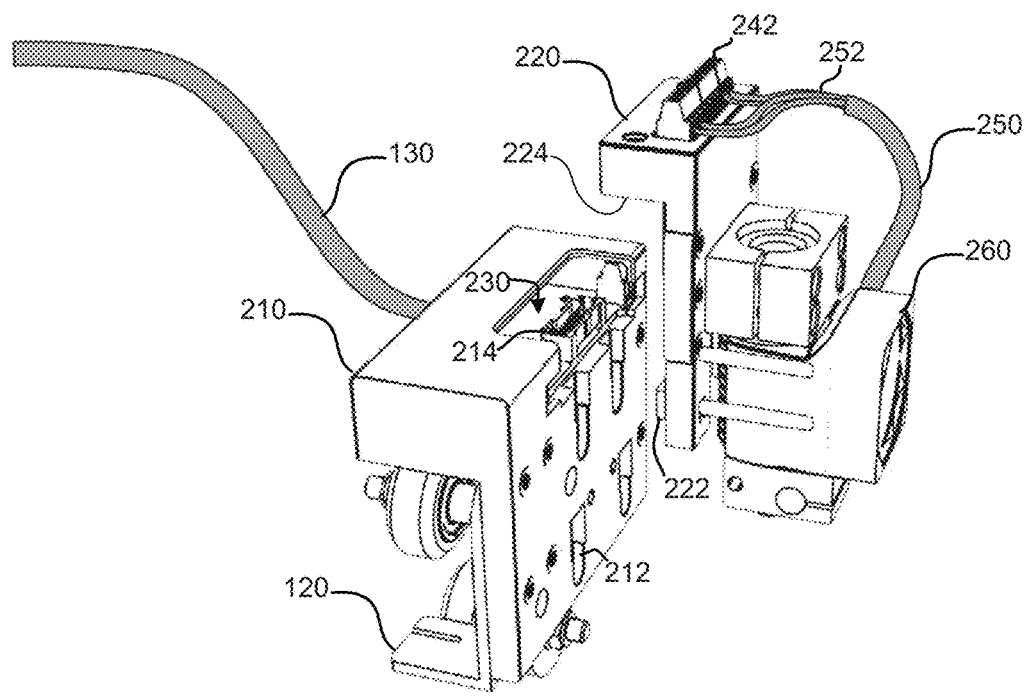
FIG. 8A is a perspective view of a fixed plate assembly mounted to the carriage plate of the machine and a detached mobile plate assembly having an exemplary tool head mounted to it, in accordance with one particular embodiment of the present invention.
Figure 8B:
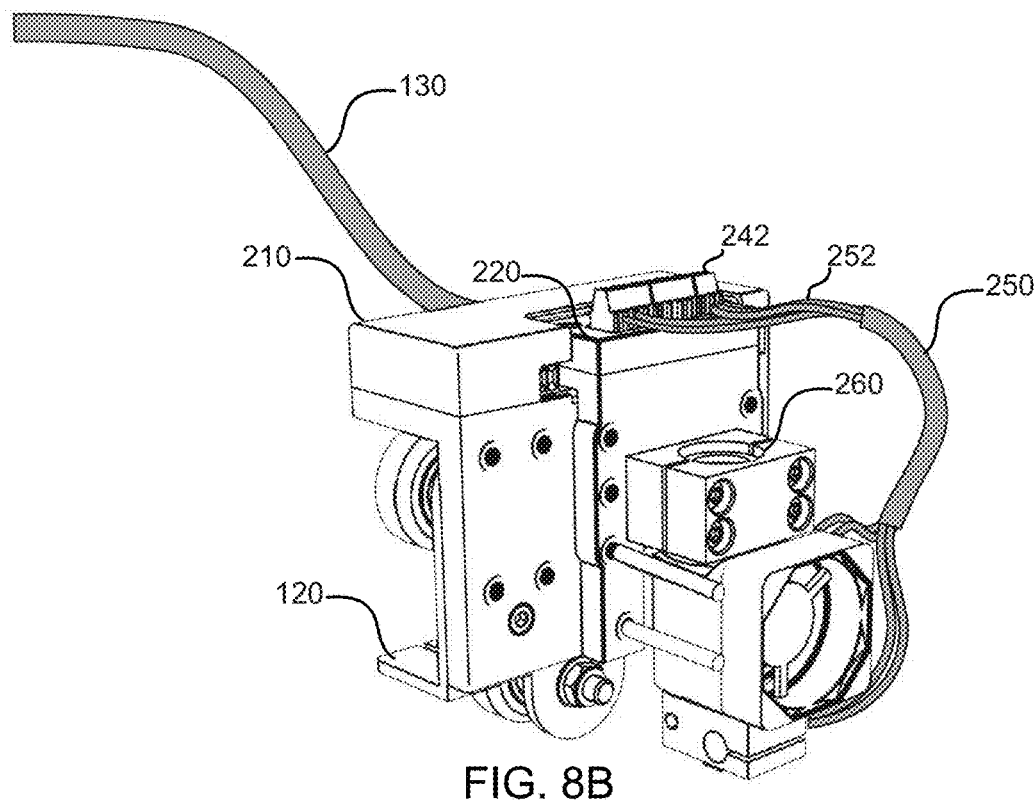
FIG. 8B is perspective view of a fixed plate assembly mounted to the carriage plate of the machine and mated with a mobile plate assembly having an exemplary tool head mounted to it, in accordance with one particular embodiment of the present invention.

Referring now to FIGS. 8A and 8B, it can be seen how the fixed plate assembly 210 and the mobile plate assembly 220 (having a tool assembly 260 mounted thereon) are mated with one another. More particularly, with the fixed plate assembly 210 previously completely mounted to the carriage plate 120 of a manufacturing machine (100 of FIG. 1) and the tool head assembly 260 mounted to the mobile plate assembly 220, the mobile plate assembly 220 is mated with the fixed plate assembly 210, by interconnection of the mating features 212, 222, and the rapid connectors 214, 224. As illustrated more particularly in FIG. 8B, the fixed plate assembly 210 accepts the mobile plate assembly 110 with the mounted tool head assembly 260, and makes a mechanical and electrical connection. By inserting the mobile plate assembly 220 into the fixed plate assembly 210, both a mechanical connection and an electrical connection are created, which completes the circuits and brings power from the manufacturing machine (100 of FIG. 1) through the wire harness 130 into the printed circuit board 230 of the fixed plate assembly 210 and further into the printed circuit board (240 of FIGS. 5A-5C) of the mobile plate assembly 220, and out from the terminal 242 to power the components of the tool head assembly 260 via wires 252 and/or wire harness 250.

Thus, FIG. 8B illustrates a universal interchangeable plate system in accordance with one particular embodiment of the invention, in a completely assembled and functioning state, with mobile plate assembly 220 both mechanically and electrically attached to the fixed plate assembly 210, with a tool head assembly 260 mounted electrically and mechanically to the mobile plate assembly 220. It can be seen from this example, how a universal interchangeable plate system of the present embodiment (i.e., having fixed plate assembly 210 and mobile plate assembly 220) can be attached to the machine 100 of FIG. 1, interposed between the carriage plate 120 and the tool head assembly 110.

Advantageously, the mobile plate assembly 220, having a particular tool head assembly 260 mounted thereon, can thus be easily detached and simultaneously electrically disconnected from the fixed plate assembly 210 and replaced with a different mobile plate assembly 220 having a different tool head assembly 260 mounted thereon. Mating of the mobile plate assembly 220 to the fixed plate assembly 210 provides the mechanical and electrical connection between the manufacturing machine (100 of FIG. 1) and the newly mounted tool head assembly 260, thus permitting quick changes of the tool head assembly to be made.

The present embodiment provides further advantages over the prior art, in that additional components (besides the tool head assembly 110) can be connected to the machine 100 of FIG. 1, simultaneously. For example, FIG. 9 shows the assembly illustrated in FIGS. 8A and 8B, but having additional components connected to the fixed plate assembly 210, both mechanically and electrically. More particularly, in FIG. 9, an exemplary bed level sensor 270 is additionally mounted to the fixed plate assembly 210 mechanically (via a bracket 272, attached to open holes in the fixed plate assembly using screws), and its electrical leads 274 are connected to the terminal blocks and/or other wire connections 236 of the printed circuit board (230 of FIGS. 5A-5C) of the fixed plate assembly 210. Any number of electrical and/or mechanical components may be connected to the fixed plate assembly 210, including without limitation, bed level sensors, fans, and lighting elements. The opportunity to mount electrical and/or mechanical components on to the fixed plate assembly 20 provides an opportunity to leave components affixed to a manufacturing machine while simultaneously being able to remove the mobile plate assembly 220 and its respective components 260.

Referring now to FIGS. 1 and 10-15, there is shown a universal, interchangeable plate system 300 in accordance with another embodiment of the present invention. As with the previously described embodiments, the plate assembly 300 includes a fixed plate assembly 310 and a mobile plate assembly 320 that are removably attached to one another, and which can be interposed between the carriage plate 120 and the tool head assembly 110 of the manufacturing machine 100. If desired, an optional adapter plate 305 may be used between the fixed plate 310 and a carriage plate 120 of the manufacturing machine 100. Such an adapter plate 305 is configured to mounting features or holes 307 that can be aligned with corresponding mounting features of a particular carriage plate 120, as well as having mounting features or holes 309 that match to corresponding mounting features 319 on the fixed plate assembly 310. This allows for greater flexibility in adapting to many carriage plate configurations as multiple adapter plates may be available in order to accommodate the widest variety of manufacturing machines.

Also as in the previously disclosed embodiments, the fixed plate assembly 310 is fixed to, or integrated with, a carriage plate 120 of the machine 100. If an adapter plate 305 is not used, then the fixed plate can be mounted directly to the carriage plate 120, by screws (not shown) passed through mounting features 319, which in one particular embodiment, are countersunk holes. Alternatively, the fixed plate assembly 310 and the carriage plate 120 can be combined into a single piece, as described above in connection with the embodiment of FIG. 3C.

As with the previously described embodiments, the fixed plate assembly 310 and mobile plate assembly 320 include complementary mechanical mating features, in order to hold them together in a tight friction fit. For example, in one particular embodiment illustrated, the coupling mechanism of the fixed plate assembly 310 includes dovetailed rails 312, 313 that are configured to slidingly engage and mate with complementary dovetailed grooves 323, 325 on the back side of the mobile plate assembly 320. The lower portion of one of the dovetail rail 312 includes a tapered portion 312a, which helps lock the rail 312 into the groove 323 of the mobile plate assembly 320 in a tight friction fit.

Figure 11:
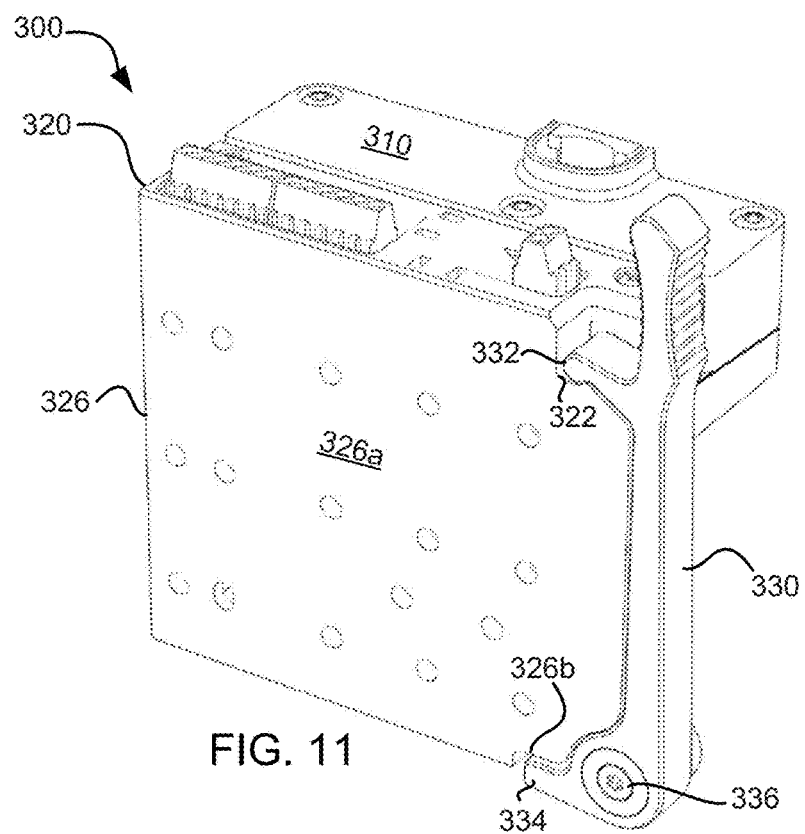
FIG. 11 is a front perspective view of the universal interchangeable plate system of FIG. 10, wherein the fixed plate assembly, mobile plate assembly and optional adapter plate are the assembled state.

Additionally, in the present particular embodiment, the coupling mechanism of the fixed plate assembly 310 includes a pivoting lever arm 330 that is used to lock the mobile plate assembly 320 into place, once it is fully mated with the fixed plate assembly 310, through the engagement of a finger 332 of the lever arm 330 and a mating indent 322 on the front face of the mobile plate assembly 320. The lever arm 330 maintains the mobile plate assembly 320 in a fixed configuration relative to the fixed plate assembly 310, and thus, in a fixed relationship relative to the carriage 120. It additionally prevents unintended vertical movement of the mobile plate 320, when locked in place. In one particular embodiment, the finger 332 and indent 322 are configured to have complementary geometries for a tight mating fit, as illustrated in FIG. 11.

Further, the lever 330 includes at its pivoting base a heel portion 334, adjacent its pivot pin 336. The heel portion 334 has two main purposes. First, when the mobile plate assembly 320 is fully mounted on the rails 312, a portion of the lower surface 326b of the mounting plate body 326 is configured to engage (and conform to, as shown in FIG. 11) the heel portion 334, thus pushing the heel portion 334 downward and rotating the lever 330 towards the mobile plate assembly 320, to lock the finger 332 into the indent 322.

Further, the heel portion 334 is also used to partially eject or detach the mobile plate assembly 320 from engagement with the fixed plate assembly 310, when the lever 330 is rotated away from the mounted mobile plate assembly 320. In particular, the top portion 336 of the lever 330 is configured to be grasped by the fingers of a user and pushed or pulled away from the mounted mobile plate assembly 320, thus, rotating the lever 330 about the pivot pin 336, while simultaneously moving the finger 332 out of the indent 322 and using the heel 334 to push the bottom portion of the mobile plate assembly 320 upward, at least partially ejecting the mobile plate 320 from its mating configuration with the fixed plate 310. In one particular embodiment of the invention, this helps raise the mobile plate assembly along the rails 312 and at least partially disengages the connectors 314 and 324 from one another.

As with the previously described embodiments, tool head assemblies (110 of FIG. 1) will be mechanically secured to the body 326 of the mobile plate assembly 320, and electrically connected to the terminal blocks 328 and/or 329. An electrical connection from the wiring harness of the machine 100 is provided to the terminal blocks 328 and 329, via the interconnection of electrical connectors 314 and 324, and a wiring harness (such as 130 of FIG. 5A) to the electrical connector 314 of the fixed plate assembly 310. As with the previous embodiments, when the electrical connectors 314 and 324 are mated together, an underside flange or ledge 321 of the mobile plate assembly 320 will nest on a shelf or shoulder 311 of the fixed plate assembly 310, providing further stability to the arrangement. Ledge 321 extends at a right angle from the back side of the body 326 of the mobile plate assembly 320. Similarly, shoulder 311 extends at a right angle to the front face 360a of the body 360 of the fixed plate assembly 310. In other words, in addition to mating with one another using the complementary mating dovetail features 312, 313, 323, 325, the top portion of the mobile plate assembly 320 (including the connector 324) overhangs, and is supported by, a part of the top portion of the fixed plate assembly 310 above the electrical connector 314, when they are mated.

Figure 11A:
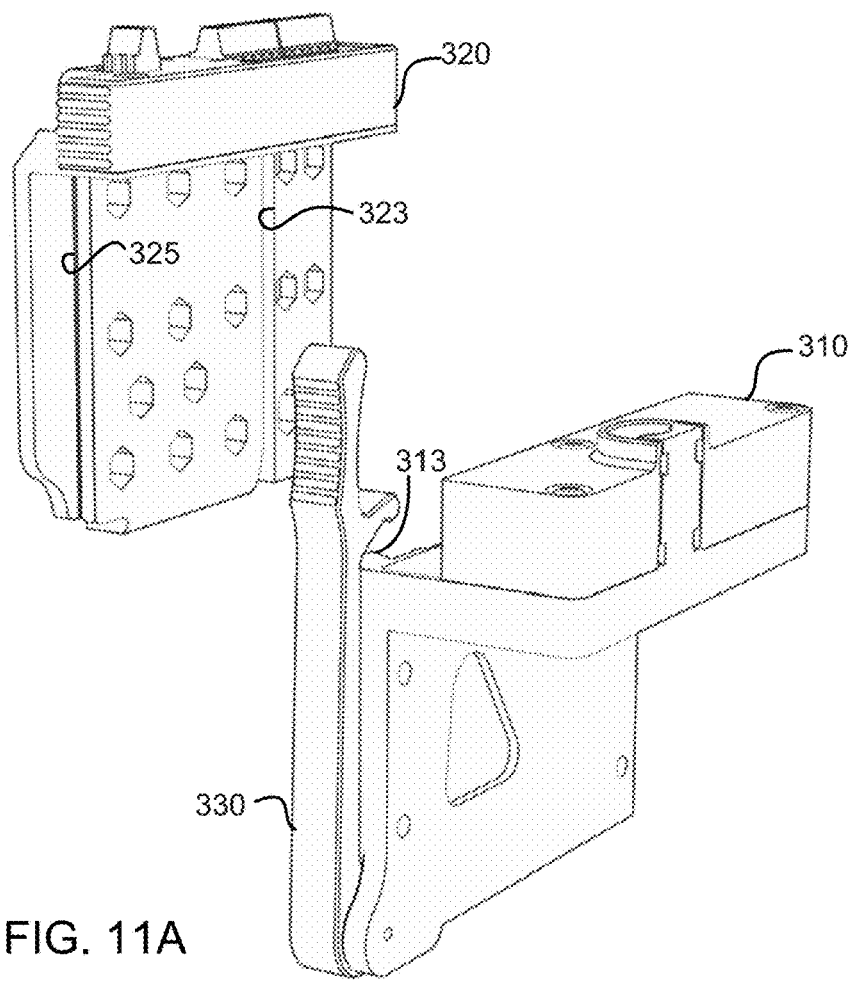
FIG. 11A is a rear perspective view of a fixed plate assembly and mobile plate assembly of the universal interchangeable plate system of FIG. 10, with the mobile plate assembly detached from the fixed plate assembly, in accordance with one particular embodiment of the invention.
Figure 11B:
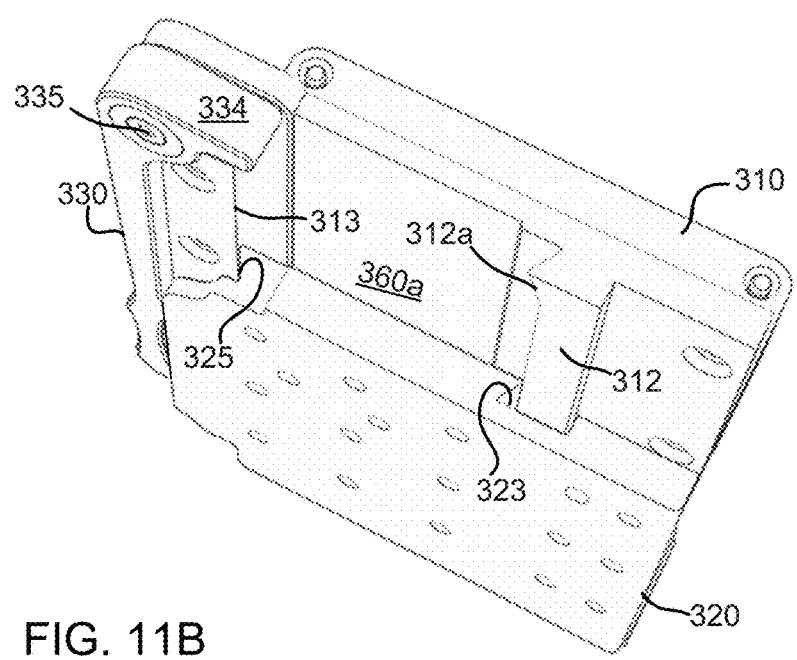
FIG. 11B is a front perspective view, taken from the bottom of a fixed plate assembly and mobile plate assembly of the universal interchangeable plate system of FIG. 10, with the mobile plate assembly partially detached from the fixed plate assembly in accordance with one particular embodiment of the invention.
Figure 12:
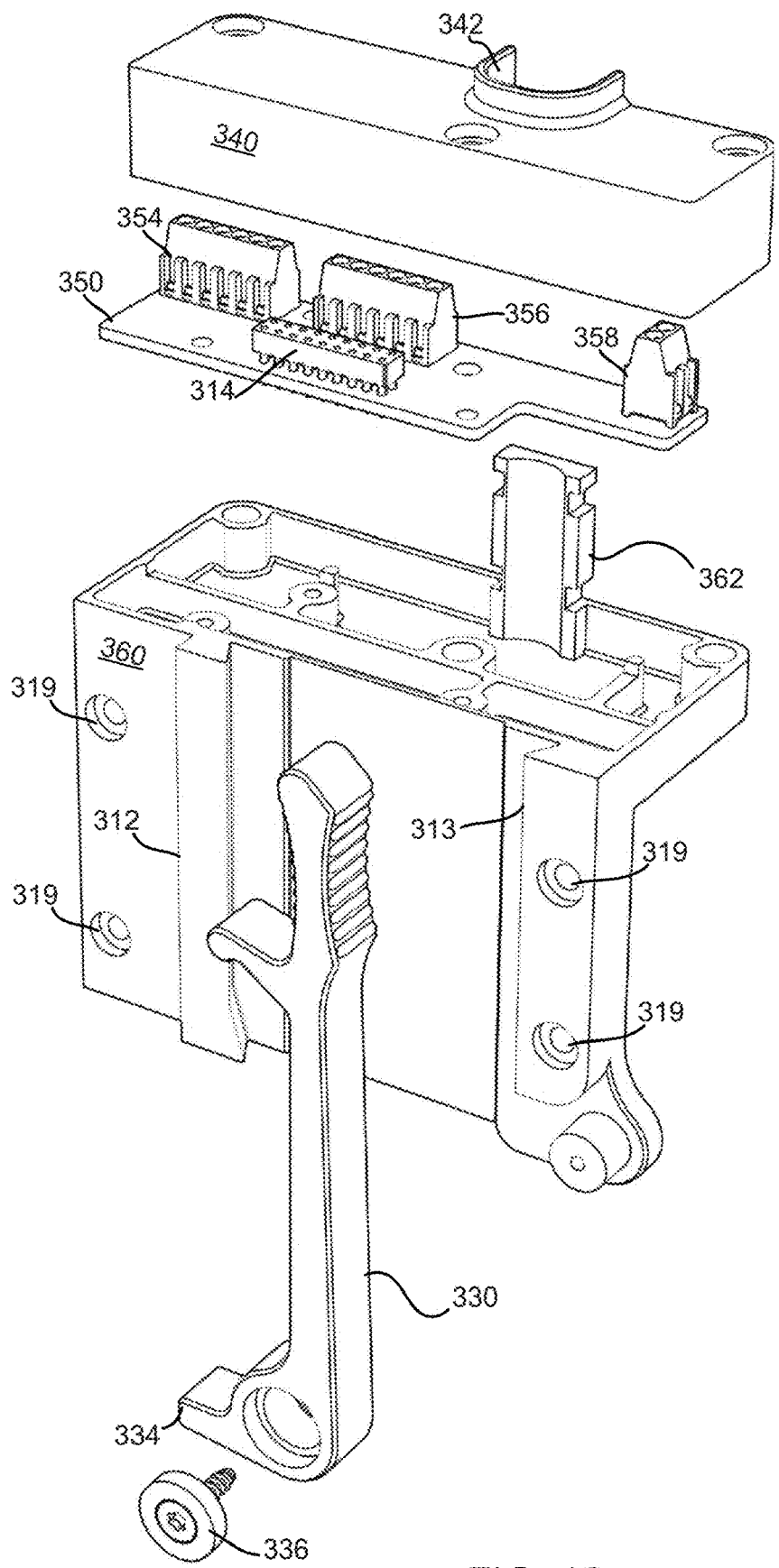
FIG. 12 is an exploded, perspective view of a fixed plate assembly in accordance with one particular embodiment of the invention.
Figure 13:
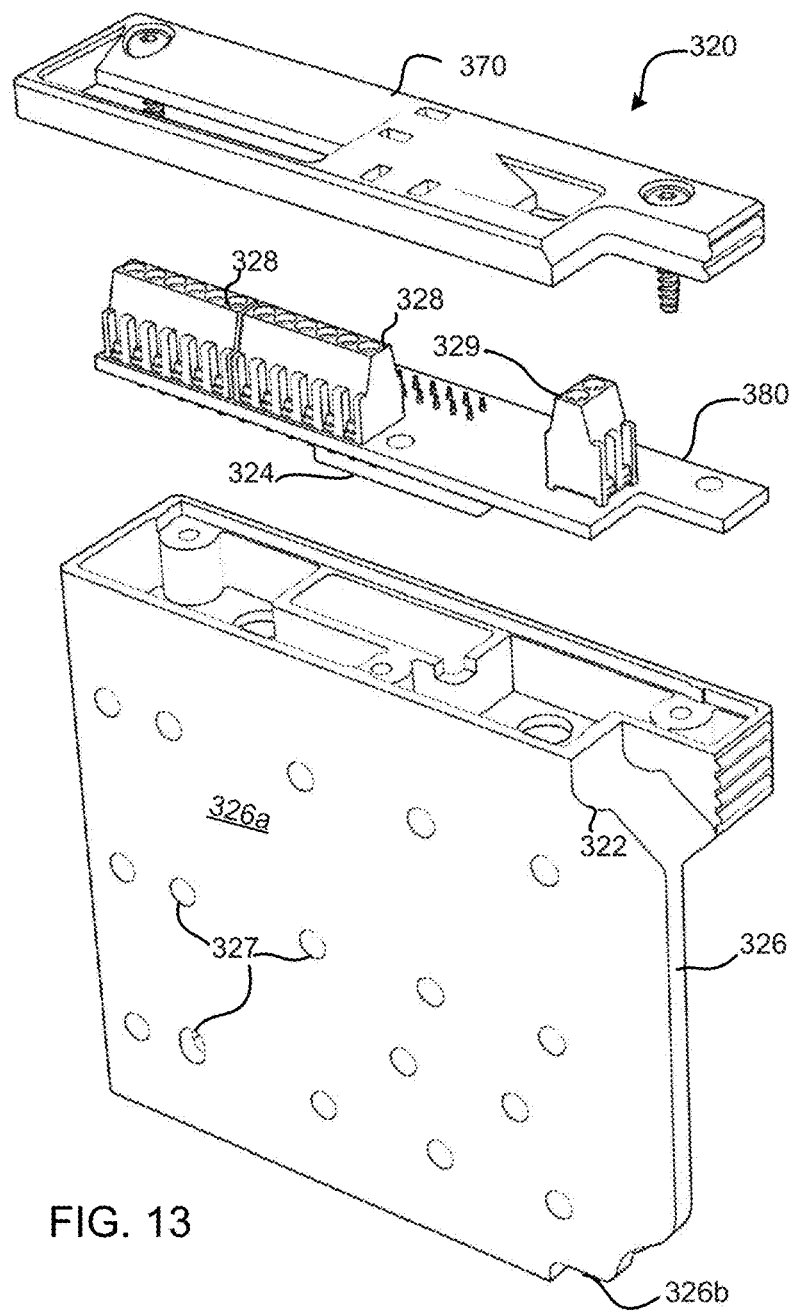
FIG. 13 is an exploded perspective view of a mobile plate assembly in accordance with one particular embodiment of the invention.
Figure 14:
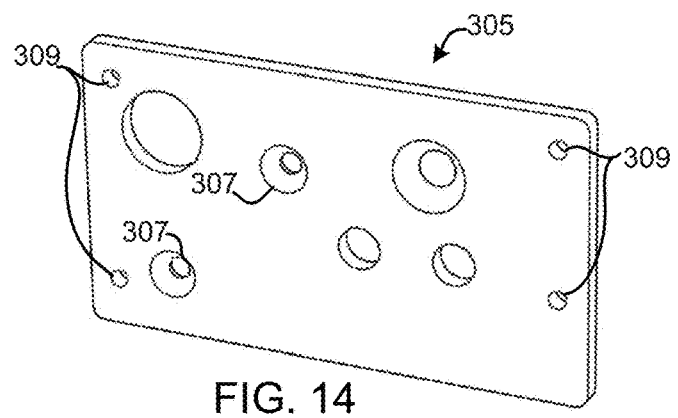
FIG. 14 is perspective view of an optional adapter plate in accordance with one particular embodiment of the invention.

Referring now more particularly, to FIGS. 11A-12, one particular embodiment of a fixed plate assembly 310 will be described. The fixed plate assembly 310 includes four main components: (1) a cover 340, (2) a printed circuit board 350, (3) a main body 360 and (4) lever arm 330. The cover 340 may cover the printed circuit board 350 and acts to protect and shield the printed circuit board 350 and underlying electrical components. Additionally, in the present exemplary embodiment, cover 340 includes a cutaway 342, through which a wiring harness (such as 130 of FIG. 5A), and/or a strain relief device 362, can pass. Wires from a wiring harness (not shown) passing through the cutaway 342 and held in place by the strain relief collar 362, are connected to the terminal blocks 354, 356 and/or 358 of the circuit board 350, which are electrically connected to the connector 314, which, in the present embodiment, is a rapid connector configured to mate with electrical connector 324 of the mobile plate assembly 320.

In addition to the strain relief collar 362, the body 360 includes the dovetail rails 312, 313, for engaging, and mating with complementary grooves 323, 325 on the mobile plate assembly 320, and the mounting features 319 for mounting the body 360 of the fixed plate assembly 310 to a carriage plate. Further, as discussed above, the pivoting lever 330 is mounted to the body 360 at a pivot point, which in the present embodiment includes a pivot pin 336 comprising a bearing surface 364, about which the lever 330 rotates, and a bearing 366 which is maintained in the lever 330 by a screw 368 screwed into, or otherwise connected to, the bearing surface 364.

Referring now to FIGS. 11A-13, the mobile plate assembly 320 includes three main components: (1) a cover 370, (2) a printed circuit board 380, and (3) a main body 390. The rear face of the main body 326 of the mobile plate assembly 320 includes mechanical mating features that are complementary or matching to the mechanical mating features on the fixed plate assembly 310, such as dovetailed slots 323, 325 configured to mate with the complementary dovetailed rails 312, 313. Additionally, the front face 326a of the body 326 includes mounting features 327, configured to mechanically mount electrical and/or mechanical components to the mobile plate assembly 320. Such mounting features may include holes, threaded inserts, and/or other mechanical fastening features.

The cover 370 covers the printed circuit board 380 of the mobile plate assembly 320 and protects and shields the printed circuit board 380 and underlying electrical components.

The circuit board 380 of the mobile plate assembly 320 of the present embodiment includes a terminal block and/or other wire connection 328, 329 to power any electrical components that may be mounted to the mobile plate assembly 320. Power is conducted from terminal blocks and/or other wire connections 328, 329 to the electrical components attached to the body 326 of the mobile plate assembly 320, via individual wires and/or a wire harness, as described in connection with the previous embodiments. The printed circuit board 380 may additionally or alternately include an electrical rapid connector 324 configured to mate with the matched rapid connector 314 on the printed circuit board of the fixed plate assembly 310, when the fixed plate assembly 310 is mated to the mobile plate assembly 320.

The printed circuit board 380 may be affixed to, and/or be incorporated into, the body 326 of the mobile plate assembly 320.

Referring back to FIGS. 1 and 10-15, it should be understood that the universal, interchangeable plate system 300 in accordance with the present embodiment is configured to be interposed between the carriage plate 120 and the tool head assembly 110 of the machine 100 of FIG. 1. In this way, a user can have several tool head assemblies attached to a plurality of mobile plate assemblies 320, which can be easily swapped out for one another, merely by pulling the lever 330, grasping the sides of the partly ejected, freed, mobile plate assembly 320, and pulling the mobile plate assembly 320 (with its attached tool head assembly) to fully detach it from the fixed plate assembly 310. The user may then select a different tool head assembly, already mounted on another mobile plate assembly 320, to attach to the fixed plate assembly 310. To do so, the user aligns slots on the mobile plate assembly 320 with the rails 312 on the fixed plate assembly 310 and slides the mobile plate assembly 320 on the rails 312, while employing the lever arm 330 to bring the mobile plate assembly 320 and fixed plate assembly 310 into full contact, whereupon the lever finger 332 engages the indentation 322, in order to maintain contact between the fixed plate assembly 310 and the mobile plate assembly 320. This action causes the mobile plate assembly 320 to be simultaneously, fully mechanically locked to the fixed plate assembly 310, and fully electrically connected to the fixed plate assembly 310, through the mated electrical connectors 312 and 324, and via this connection, to the power supply for the system. No separate electrical connections need to be made at this time in order to provide power to the tool head assembly carried by the particular mobile plate assembly 320.

Figure 15:
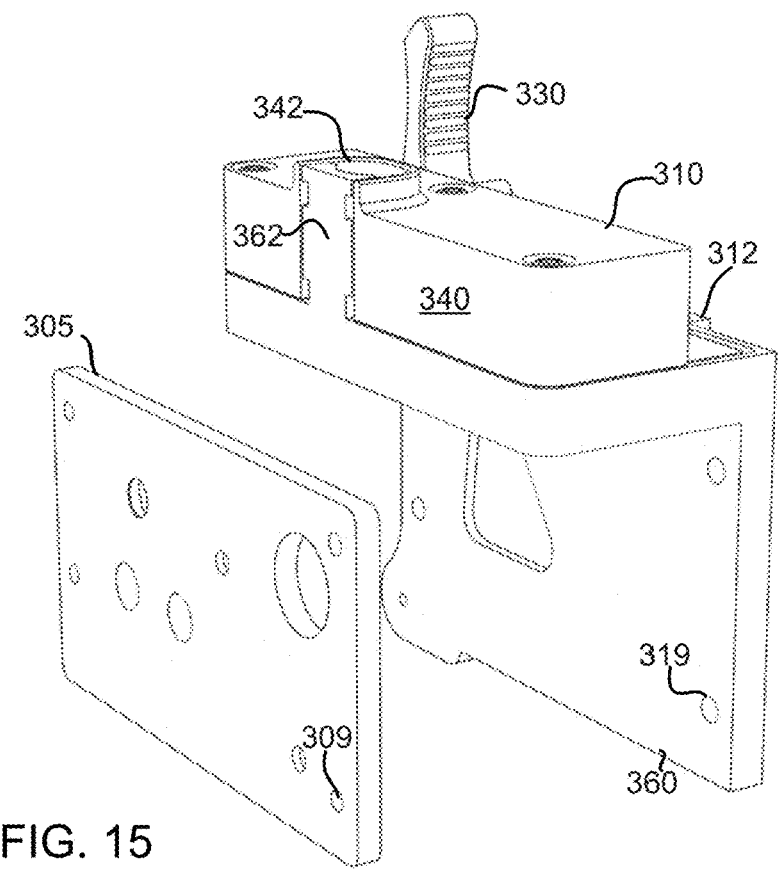
FIG. 15 is a perspective view from the rear, of a fixed plate assembly in accordance with one embodiment of the invention shown detached from an adapter plate, such as the adapter plate of FIG. 14.

It should be noted that FIG. 15 is provided for exemplary purposes only. In use, the adapter plate 305 should be connected to the carriage plate (120 of FIG. 1), prior to attachment to the fixed plate 310.

Figure 16:
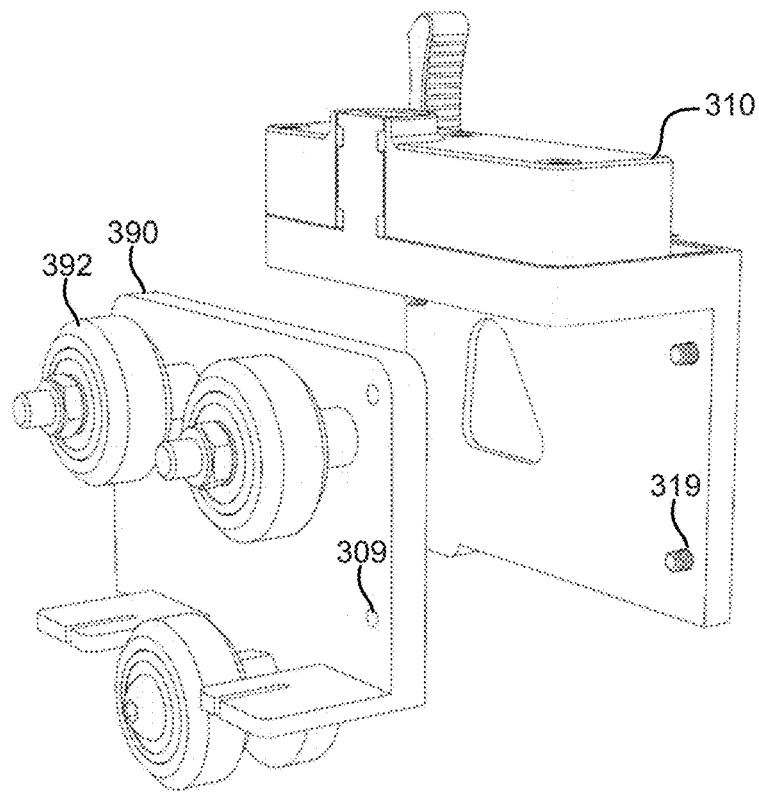
FIG. 16 is a perspective view from the rear, of a fixed plate assembly in accordance with another embodiment of the invention in which an adapter plate and carriage plate are combined.

Referring now to FIG. 16, there is shown a carriage assembly 390 in accordance with another embodiment of the present invention, wherein the adapter plate (305 of FIG. 15) and the carriage plate (120 of FIG. 1) are combined into a single element (including the necessary bearing feature or features, such as roller bearings 392, linear rails, etc.) that is attached to the machine (100 of FIG. 1), in place of its existing x-carriage plate (120 of FIG. 1). The fixed plate assembly 310 would then be mounted to the carriage assembly 390.

Figure 17:
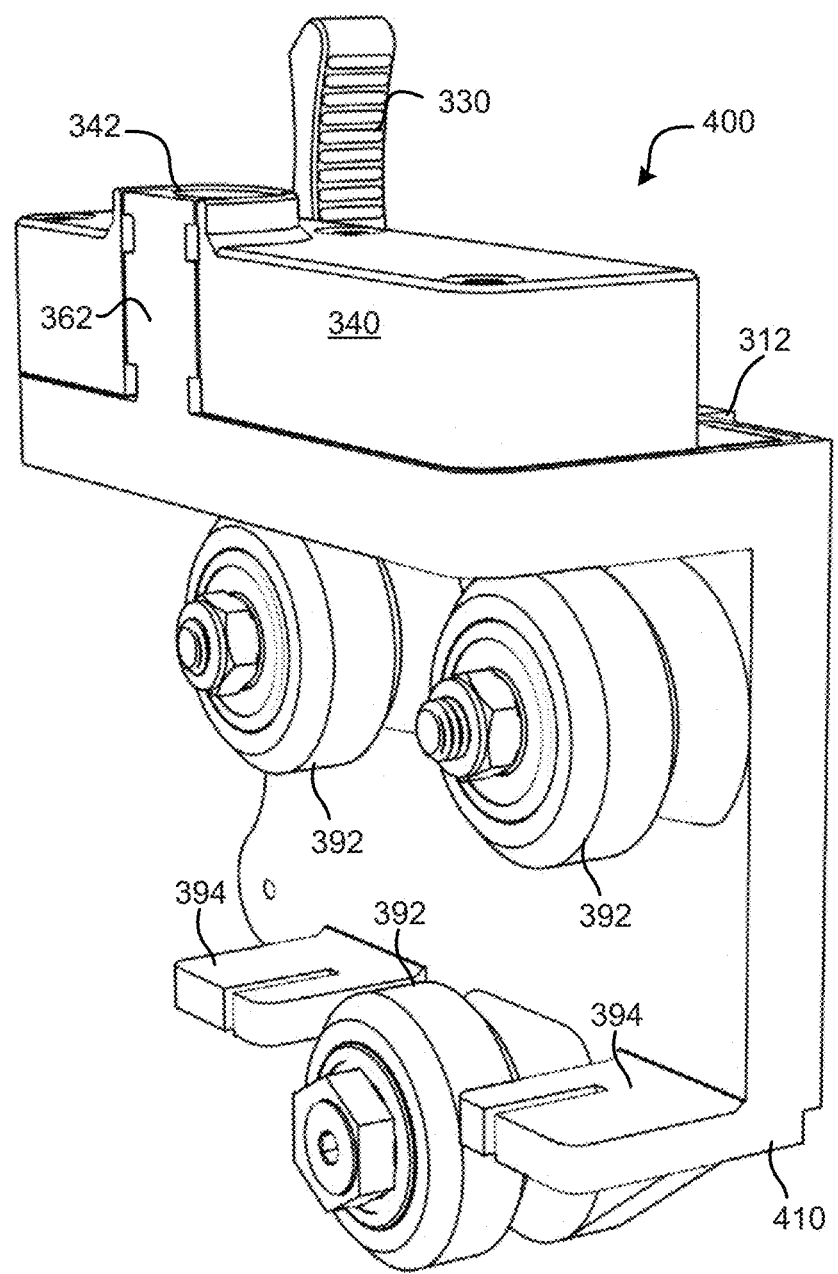
FIG. 17 is a perspective view from the rear, of a fixed plate assembly in accordance with a further embodiment of the invention, in which the fixed plate assembly replaces the carriage plate of the manufacturing machine.

Referring now to FIG. 17, there is shown a fixed plate assembly 400 in accordance with a further embodiment of the invention. The fixed plate assembly 400 includes, combined therewith, all of the features of the x-carriage plate (120 of FIG. 1), including a bearing feature, illustrated as roller bearings 392, and belt attachment points 394. The fixed plate assembly 400 is otherwise configured, from the front and top, in the same manner as the fixed plate assembly 310 of FIG. 11, including mounting features, such as dovetail rails 312, a cover 340, a pivoting lever 330, etc., but mounted on a combined body 410, rather than having a carriage plate that is removably mounted to a body of the fixed plate assembly. This would permit removal of the machine's own carriage plate, and replacement with the combined fixed plate assembly 400, thus allowing a fixed plate assembly in accordance with the present invention to be mounted directly to the machine, and saving some distance offset created by the combination of an adapter plate and carriage plate. The fixed plate assembly 400 is configured to interface with a mobile plate assembly 320 of FIGS. 10-13, as described in connection with the foregoing embodiments, without further modification.

As can be seen, the present invention provides a universal, interchangeable plate system for mounting tool heads and/or components on manufacturing machines that includes a fixed plate assembly on the x-carriage of the manufacturing machine. A mobile plate assembly removably mates with the fixed plate assembly, to provide mechanical support and electrical connectivity to a tool head assembly mounted to the mobile plate assembly. The mobile plate assembly can be easily detached from the fixed plate assembly and replaced with a different mobile plate assembly having a different tool head assembly mounted thereon. Mating of the mobile plate assembly to the fixed plate assembly provides the mechanical and electrical connection between the manufacturing machine and the newly mounted tool head assembly, thus permitting quick changes of the tool head assembly to be made.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims. Additionally, features from particular described embodiments may be interchanged with parts of different embodiments, without restriction.

The invention claimed is:

1. A plate system for interchangeably mounting tool heads and/or components on a manufacturing machine, comprising:
　a fixed plate assembly configured for attachment to the manufacturing machine, said fixed plate assembly including:
　　a first body portion including a first mechanical mating feature;
　　a first electrical connector configured to receive an input power and to provide an output power;
　a mobile plate assembly including:
　　a second body portion including a second mechanical mating feature, complementary to said first mechanical mating feature;
　　said second body portion additionally including a mounting feature for mounting the tools and/or components; and
　　a second electrical connector configured to mate with said first electrical connector;
　said fixed plate assembly and said mobile plate assembly configured to removably mate with one another, such that said first electrical connector is mated with said second electrical connector when said first mechanical mating feature is fully mated with said second mechanical mating feature;
　said fixed plate assembly configured to receive input power from a power supply of the manufacturing machine; and
　said mobile plate assembly configured to receive electrical leads from a tool head assembly mounted to said body of said mobile plate assembly, and to provide power to said tool head assembly from said power supply via the interconnection of said first and second connectors and said electrical leads.

2. The plate system according to claim 1, wherein the fixed plate assembly is mounted to an x-carriage of the manufacturing machine, via a carriage plate of the manufacturing machine.

3. The plate system according to claim 2, wherein said first body portion further comprises a mechanical mounting feature arranged to align with a mechanical mounting feature of the carriage plate of the manufacturing machine.

4. The plate system according to claim 1, wherein said first connector includes a first rapid connector and said second connector is a mating rapid connector complementary to said first rapid connector.

5. The plate system according to claim 1, wherein said first body portion includes at least one mounting feature for mounting a component directly to said fixed plate assembly, and at least one additional electrical connector to provide power to said component mounted directly to said fixed plate assembly.

6. The plate system according to claim 1, wherein said first connector of said fixed plate assembly is disposed on a top face of said fixed plate assembly, at a right angle to a front face of said first body portion including said first mating feature, and said second connector of said mobile plate assembly is disposed on a bottom face of said mobile plate assembly at a right angle to a rear face of said second body portion including said second mating feature, such that mating of said mobile plate assembly and said fixed plate assembly additionally brings together said top face with said bottom face, and said front face with said rear face in a nested configuration.

7. The plate system according to claim 6, wherein said fixed plate assembly further includes a pivoting lever configured to lock said mobile plate assembly to said body of said fixed plate assembly in said nested configuration, when said mobile plate assembly is coupled with said fixed plate assembly.

8. A plate system for interchangeably mounting tool heads and/or components on a manufacturing machine, comprising:
   a fixed plate assembly configured for attachment to the manufacturing machine, said fixed plate assembly including:
      a first body portion including a first mechanical mating feature;
      a first electrical connector configured to receive an input power and to provide an output power;
   a mobile plate assembly including:
      a second body portion including a second mechanical mating feature, complementary to said first mechanical mating feature;
      said second body portion additionally including a mounting feature for mounting the tools and/or components; and
      a second electrical connector configured to mate with said first electrical connector;
   said fixed plate assembly and said mobile plate assembly configured to removably mate with one another, such that said first electrical connector is mated with said second electrical connector when said first mechanical mating feature is fully mated with said second mechanical mating feature; and
   said fixed plate assembly further including a pivoting lever configured to lock said mobile plate assembly to said body of said fixed plate assembly when said mobile plate assembly is coupled with said fixed plate assembly.

9. An additive and/or subtractive manufacturing machine including a build platform and an x-carriage arranged relative to a build platform, the manufacturing machine comprising:
   a plate system for interchangeably mounting tool heads and/or components on a manufacturing machine, including:
      a fixed plate assembly configured for attachment to the manufacturing machine, said fixed plate assembly including:
         a first body portion including a first mechanical mating feature;
         a first electrical connector configured to receive an input power and to provide an output power;
      a mobile plate assembly including:
         a second body portion including a second mechanical mating feature, complementary to said first mechanical mating feature;
         said second body portion additionally including a mounting feature for mounting the tools and/or components; and
         a second electrical connector configured to mate with said first electrical connector;
      said fixed plate assembly and said mobile plate assembly configured to removably mate with one another, such that said first electrical connector is mated with said second electrical connector when said first mechanical mating feature is fully mated with said second mechanical mating feature;
   said plate system mounted to the x-carriage; and
   a tool head assembly mechanically connected to said mobile plate assembly.

10. The manufacturing machine of claim 9, further comprising a power supply connected to said fixed plate assembly, wherein said tool head assembly is additionally electrically connected to said second connector of said mobile plate assembly and receives power from said power supply through the connection between said first connector and said second connector.

11. The manufacturing machine of claim 10, wherein said fixed plate assembly includes at least one bearing feature connecting it directly to the x-carriage.

12. The manufacturing machine of claim 10, further comprising a carriage plate attached to the x-carriage, wherein said fixed plate is mechanically connected to said carriage plate.

* * * * *